US012240152B2

(12) United States Patent
Dikovsky et al.

(10) Patent No.: US 12,240,152 B2
(45) Date of Patent: Mar. 4, 2025

(54) COMPOSITION AND METHOD FOR ADDITIVE MANUFACTURING OF AN OBJECT

(71) Applicant: Stratasys Ltd., Rehovot (IL)

(72) Inventors: Daniel Dikovsky, Ariel (IL); Shai Hirsch, Rehovot (IL)

(73) Assignee: Stratasys Ltd., Rehovot (IL)

( * ) Notice: Subject to any disclaimer, the term of this patent is extended or adjusted under 35 U.S.C. 154(b) by 614 days.

(21) Appl. No.: 17/463,632

(22) Filed: Sep. 1, 2021

(65) Prior Publication Data

US 2021/0394401 A1 Dec. 23, 2021

Related U.S. Application Data

(63) Continuation of application No. 15/117,825, filed as application No. PCT/IL2015/050157 on Feb. 10, 2015, now abandoned.

(60) Provisional application No. 61/937,773, filed on Feb. 10, 2014.

(51) Int. Cl.
| | |
|---|---|
| *B29C 35/08* | (2006.01) |
| *B29C 64/112* | (2017.01) |
| *B29C 64/129* | (2017.01) |
| *B33Y 10/00* | (2015.01) |
| *B33Y 70/00* | (2020.01) |
| *C09D 4/00* | (2006.01) |
| *C09D 11/101* | (2014.01) |
| *C09D 11/30* | (2014.01) |

(52) U.S. Cl.
CPC ........ *B29C 35/0805* (2013.01); *B29C 64/112* (2017.08); *B29C 64/129* (2017.08); *B33Y 10/00* (2014.12); *B33Y 70/00* (2014.12); *C09D 4/00* (2013.01); *C09D 11/101* (2013.01); *C09D 11/30* (2013.01); *B29C 2035/0827* (2013.01); *B29K 2995/0089* (2013.01); *B29K 2995/0092* (2013.01)

(58) Field of Classification Search
None
See application file for complete search history.

(56) References Cited

U.S. PATENT DOCUMENTS

| | | | |
|---|---|---|---|
| 6,114,406 A | 9/2000 | Caiger et al. | |
| 6,259,962 B1 | 7/2001 | Gothait | |
| 6,569,373 B2 | 5/2003 | Napadensky | |
| 6,658,314 B1 | 12/2003 | Gothait | |
| 6,841,116 B2 | 1/2005 | Schmidt | |
| 6,850,334 B1 | 2/2005 | Gothait | |
| 7,183,335 B2 | 2/2007 | Napadensky | |
| 7,209,797 B2 | 4/2007 | Kritchman et al. | |
| 7,225,045 B2 | 5/2007 | Gothait et al. | |
| 7,300,619 B2 | 11/2007 | Napadensky et al. | |
| 7,314,591 B2 | 1/2008 | Priedeman, Jr. | |
| 7,479,510 B2 | 1/2009 | Napadensky et al. | |
| 7,500,846 B2 | 3/2009 | Eshed et al. | |
| 7,851,122 B2 | 12/2010 | Napadensky | |
| 7,962,237 B2 | 6/2011 | Kritchman | |
| 2003/0083771 A1 | 5/2003 | Schmidt | |
| 2003/0207959 A1 | 11/2003 | Napadensky et al. | |
| 2003/0209836 A1 | 11/2003 | Sherwood | |
| 2004/0187714 A1 | 9/2004 | Napadensky et al. | |
| 2011/0180952 A1 | 7/2011 | Napadensky | |
| 2012/0231232 A1 | 9/2012 | Xu et al. | |
| 2013/0073068 A1 | 3/2013 | Napadensky | |
| 2013/0116358 A1 | 5/2013 | Rrahimi | |
| 2013/0234370 A1 | 9/2013 | Suzuki et al. | |
| 2014/0035995 A1 | 2/2014 | Chou et al. | |
| 2017/0173865 A1 | 6/2017 | Dikovsky et al. | |

FOREIGN PATENT DOCUMENTS

| | | | | |
|---|---|---|---|---|
| EP | 2161312 | | 3/2010 | |
| EP | 2436510 A1 | * | 4/2012 | ........... B29C 67/007 |
| WO | WO 2012/070053 | | 5/2012 | |
| WO | WO 2013/037277 | | 3/2013 | |
| WO | WO 2013/128452 | | 9/2013 | |
| WO | WO 2015/118552 | | 8/2015 | |
| WO | WO 2016/125170 | | 8/2016 | |

OTHER PUBLICATIONS

Communication Pursuant to Article 94(3) EPC Dated Aug. 24, 2021 From the European Patent Office Re. Application No. 15746007.2. (4 Pages).
Applicant-Initiated Interview Summary Dated Feb. 25, 2020 From the US Patent and Trademark Office Re. U.S. Appl. No. 15/117,825. (3 pages).
Communication Pursuant to Article 94(3) EPC Dated Nov. 4, 2019 From the European Patent Office Re. Application No. 15746007.2. (5 Pages).

(Continued)

*Primary Examiner* — Sanza L. McClendon

(57) ABSTRACT

Formulations and methods employing these formulation for fabricating an object by additive manufacturing, such as three-dimensional inkjet printing are provided. The formulations comprise at least 50 weight percents of hydrophilic curable materials, and upon curing, provide a material that is characterized by water absorbance of at least 5%, and by high HDT and impact resistance values. Objects containing cured material made of these formulations are also provided.

17 Claims, 3 Drawing Sheets

(56) References Cited

OTHER PUBLICATIONS

Figure 1:
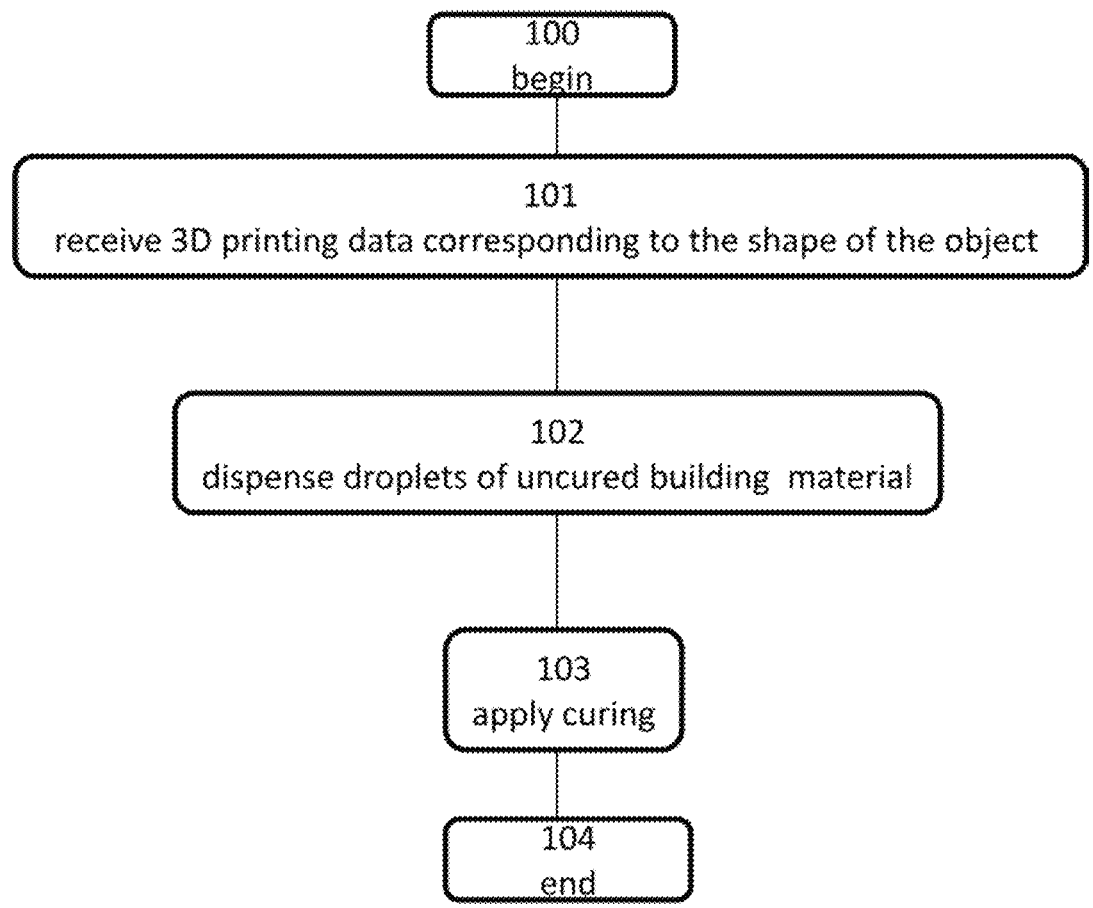

Communication Pursuant to Rule 164(1) EPC [Supplementary Partial European Search Report and the European Provisional Opinion] Dated Jul. 28, 2017 From the European Patent Office Re. Application No. 15746007.2. (13 Pages).
Final Official Action Dated Nov. 16, 2020 from the US Patent and Trademark Office Re. U.S. Appl. No. 15/117,825. (14 pages).
International Preliminary Report on Patentability Dated Aug. 25, 2016 From the International Bureau of WIPO Re. Application No. PCT/IL2015/050157.
International Search Report and the Written Opinion Dated May 21, 2015 From the International Searching Authority Re. Application No. PCT/IL2015/050157.
Interview Summary Dated Feb. 26, 2021 From the US Patent and Trademark Office Re. U.S. Appl. No. 15/117,825. (2 Pages).
Office Action Dated Feb. 2, 2020 From the Israel Patent Office Re. Application No. 247200 and Its Translation Into English. (9 Pages).
Office Action Dated Aug. 3, 2020 From the Israel Patent Office Re. Application No. 247200 and Its Translation Into English. (7 Pages).
Office Action Dated Jul. 8, 2019 From the Israel Patent Office Re. Application No. 247200 and Its Translation Into English. (7 Pages).
Office Action Dated Dec. 9, 2018 From the Israel Patent Office Re. Application No. 247200 and Its Translation Into English. (8 Pages).
Official Action Dated Oct. 1, 2018 From the US Patent and Trademark Office Re. U.S. Appl. No. 15/117,825. (18 pages).
Official Action Dated Jun. 1, 2021 from the US Patent and Trademark Office Re. U.S. Appl. No. 15/117,825. (13 pages).
Official Action Dated Oct. 22, 2019 From the US Patent and Trademark Office Re. U.S. Appl. No. 15/117,825. (12 pages).
Official Action Dated Apr. 26, 2019 From the US Patent and Trademark Office Re. U.S. Appl. No. 15/117,825. (12 pages).
Official Action Dated Apr. 6, 2020 from the US Patent and Trademark Office Re. U.S. Appl. No. 15/117,825. (14 pages).
Restriction Official Action Dated Jun. 15, 2018 From the US Patent and Trademark Office Re. U.S. Appl. No. 15/117,825. (8 pages).
Supplementary European Search Report and the European Search Opinion Dated Oct. 27, 2017 From the European Patent Office Re. Application No. 15746007.2. (12 Pages).

* cited by examiner

COMPOSITION AND METHOD FOR ADDITIVE MANUFACTURING OF AN OBJECT

RELATED APPLICATIONS

This application is a continuation of U.S. patent application Ser. No. 15/117,825 filed on Aug. 10, 2016, which is a National Phase of PCT Patent Application No. PCT/IL2015/050157 having International Filing Date of Feb. 10, 2015, which claims the benefit of priority under 35 USC § 119(e) of U.S. Provisional Patent Application No. 61/937,773 filed on Feb. 10, 2014. The contents of the above applications are all incorporated by reference as if fully set forth herein in their entirety.

FIELD AND BACKGROUND OF THE INVENTION

The present invention, in some embodiments thereof, relates to Additive Manufacturing (AM) of an object, and, more particularly, but not exclusively, to a composition and method for additive manufacturing of an object which exhibits desirable mechanical properties.

Additive manufacturing is generally a process in which a three-dimensional (3D) object is manufactured utilizing a computer model of the objects. Such a process is used in various fields, such as design related fields for purposes of visualization, demonstration and mechanical prototyping, as well as for rapid manufacturing (RM).

The basic operation of any AM system consists of slicing a three-dimensional computer model into thin cross sections, translating the result into two-dimensional position data and feeding the data to control equipment which manufacture a three-dimensional structure in a layerwise manner.

Various AM technologies exist, amongst which are stereolithography, digital light processing (DLP), and three dimensional (3D) printing, 3D inkjet printing in particular. Such techniques are generally performed by layer by layer deposition and solidification of one or building materials, typically photopolymerizable (photocurable) materials.

Stereolithography, for example, is an additive manufacturing process which employs a liquid UV-curable building material and a UV laser. In such a process, for each dispensed layer of the building material, the laser beam traces a cross-section of the part pattern on the surface of the dispensed liquid building material. Exposure to the UV laser light cures and solidifies the pattern traced on the building material and joins it to the layer below. After being built, the formed parts are immersed in a chemical bath in order to be cleaned of excess building material and are subsequently cured in an ultraviolet oven.

In three-dimensional printing processes, for example, a building material is dispensed from a dispensing head having a set of nozzles to deposit layers on a supporting structure. Depending on the building material, the layers may then be cured or solidified using a suitable device.

Various three-dimensional printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,479,510, 7,500,846, 7,962,237 and U.S. Patent Application having Publication No. 2013/0073068, all of the same Assignee, the contents of which are hereby incorporated by reference.

In a 3D inkjet printing process such as Polyjet™ (Stratasys Ltd., Israel), the building material is selectively jetted from one or more printing heads and deposited onto a fabrication tray in consecutive layers according to a pre-determined configuration as defined by a software file.

A printing system utilized in additive manufacturing may include a receiving medium and one or more printing heads. The receiving medium can be, for example, a fabrication tray that may include a horizontal surface to carry the material dispensed from the printing head. The printing head may be, for example, an ink jet head having a plurality of dispensing nozzles arranged in an array of one or more rows along the longitudinal axis of the printing head. The printing head may be located such that its longitudinal axis is substantially parallel to the indexing direction. The printing system may further include a controller, such as a microprocessor to control the printing process, including the movement of the printing head according to a pre-defined scanning plan (e.g., a CAD configuration converted to a Stereo Lithography (STL) format and programmed into the controller). The printing head may include a plurality of jetting nozzles. The jetting nozzles dispense material onto the receiving medium to create the layers representing cross sections of a 3D object.

In addition to the printing head, there may be a source of curing energy, for curing the dispensed building material. The curing energy is typically radiation, for example, UV radiation.

Additionally, the printing system may include a leveling device for leveling and/or establishing the height of each layer after deposition and at least partial solidification, prior to the deposition of a subsequent layer.

The building materials may include modeling materials and support materials, which form the object and the temporary support constructions supporting the object as it is being built, respectively.

The modeling material (which may include one or more material) is deposited to produce the desired object/s and the support material (which may include one or more materials) is used, with or without modeling material elements, to provide support structures for specific areas of the object during building and assure adequate vertical placement of subsequent object layers, e.g., in cases where objects include overhanging features or shapes such as curved geometries, negative angles, voids, and so on.

Both the modeling and support materials are preferably liquid at the working temperature at which they are dispensed, and subsequently hardened, typically upon exposure to curing energy (e.g., UV curing), to form the required layer shape. After printing completion, support structures are removed to reveal the final shape of the fabricated 3D object.

In order to be compatible with most of the commercially-available printing heads utilized in a 3D inkjet printing system, the uncured building material should feature the following characteristics: Brookfield Viscosity of 10 to 20 cps at the working (e.g., jetting) temperature; Newtonian liquid behavior; Surface tension of 20 to 32 Dyne/cm; and High reactivity to UV radiation.

For example, a thin layer (5-40 microns) of the building material should be sufficiently cured within about 200 milliseconds when exposed to UV radiation (of 0.5 W/cm$^2$, 340-390 nm), in order to enable the building of subsequent layers.

For stereolithographic AM, the uncured building material should preferably exhibit Newtonian liquid behavior; and High reactivity to UV radiation, as for 3D inkjet printing. Since no jetting is involved in this methodology, materials having variable viscosity can be used. Exemplary suitable photo-curable compositions are disclosed, for example, in U.S. Pat. No. 5,705,316.

When a cured rigid modeling forms the final object, the cured material should preferably exhibit heat deflection temperature (HDT) which is higher than room temperature, in order to assure its usability. Typically, the cured modeling material should exhibit HDT of at least 35° C. For an object to be stable in variable conditions, a higher HDT is desirable.

Currently available UV-curable modeling material formulations for forming rigid objects by inkjet printing, and which exhibit the properties required for 3D inkjet printing, while being jetted, as described herein, typically exhibit HDT in the range of 35-50° C. Exemplary such formulations are generally described, for example, in U.S. Pat. No. 7,479,510, of the same Assignee.

Such modeling material formulations, when cured, typically feature impact resistance in the range of 20-25 J/m.

While rigid objects, or parts thereof, fabricated by AM, should desirably exhibit good durability and stability, a cured modeling material should feature both high HDT and high toughness, i.e., impact resistance. Yet, a trade-off exists between HDT and toughness, since materials that exhibit high HDT typically exhibit low impact resistance, and materials exhibiting high impact resistance typically exhibit low HDT.

SUMMARY OF THE INVENTION

The present inventors have now uncovered that a modeling material formulation, which, when cured, is characterized by high water absorbance, also presents an unprecedented combination of high impact resistance (toughness) and high thermal resistance (HDT). The present inventors have therefore designed and practiced methodologies for fabricating objects by AM, while utilizing modeling material formulations that include hydrophilic materials which impart to the formulation, when cured, a relatively high capability to absorb water.

The modeling formulation presented herein comprises one or more hydrophilic mono-functional materials(s), optionally in combination with one or more multi-functional hydrophilic material(s), and further optionally in combination with one or more of additional mono- and/or multi-functional materials. Cured modeling materials (e.g., 3D objects or parts thereof) made of such formulations exhibit high toughness and high HDT, contrary to cured materials made of commercially available formulations, which are characterized by lower water absorbance (and lower if not mollified content of hydrophilic curable materials), in which if the cured materials exhibit a similar HDT, the impact resistance is lower, or if the cured materials exhibit similarly high impact resistance, the HDT is lower (see, for example, FIG. 3).

According to an aspect of some embodiments of the present invention there is provided a method of additive manufacturing of a three-dimensional object, the method comprising sequentially forming a plurality of layers in a configured pattern corresponding to the shape of the object, thereby forming the object, wherein the formation of each layer comprises dispensing at least one uncured building material, and exposing the dispensed building material to curing energy to thereby form a cured modeling material, and wherein the uncured building material comprises an uncured modeling formulation, the uncured modeling formulation comprising at least one hydrophilic mono-functional curable material and/or at least one hydrophilic multi-functional curable material, wherein a total concentration of the at least one hydrophilic mono-functional curable material and the at least one hydrophilic multi-functional curable material is at least 50 weight percents of the total weight of the uncured modeling formulation.

According to some of any of the embodiments of the invention, the cured modeling material obtained upon curing the formulation is characterized by water absorption of at least 5%.

According to an aspect of some embodiments of the present invention there is provided a method of additive manufacturing of a three-dimensional object, the method comprising sequentially forming a plurality of layers in a configured pattern corresponding to the shape of the object, thereby forming the object; wherein the formation of each layer comprises dispensing at least one uncured building material, and exposing the dispensed building material to curing energy to thereby form a cured modeling material, and wherein the uncured building material comprises a modeling formulation selected such that a cured modeling material obtained upon curing the formulation is characterized by a water absorption of at least 5%.

According to some of any of the embodiments of the invention, the water absorption ranges from 5% to 30%.

According to some of any of the embodiments of the invention, the uncured modeling formulation is selected such that a cured modeling material obtained upon curing the formulation is characterized by HDT higher than 40° C. and an impact resistance higher than 20 J/m.

According to some of any of the embodiments of the invention, the cured modeling material obtained upon curing the formulation is characterized by HDT higher than 45° C.

According to some of any of the embodiments of the invention, the cured modeling material obtained upon curing the formulation is characterized by an impact resistance higher than 30 J/m.

According to some of any of the embodiments of the invention, the uncured modeling formulation comprises at least one hydrophilic mono-functional curable material and/or at least one hydrophilic multi-functional curable material, and wherein a total concentration of the at least one hydrophilic mono-functional curable material and the at least one hydrophilic multi-functional curable material is at least 50 weight percents of the total weight of the uncured modeling formulation.

According to some of any of the embodiments of the invention, the total concentration of the at least one hydrophilic mono-functional curable material and the at least one hydrophilic multi-functional curable material ranges from 50 to 80 weight percents.

According to some of any of the embodiments of the invention, each of the at least one hydrophilic mono-functional curable material and the at least one hydrophilic multi-functional curable material independently comprises at least one hydrophilic group.

According to some of any of the embodiments of the invention, the hydrophilic group is selected from the group consisting of a heteroatom, a carboxylate, a thiocarboxylate, oxo, an amide, hydroxy, alkoxy, an alcohol, a heteroalicyclic, a lactone, a lactam, a carbamate, a thiocarbamate, cyanurate, an isocyanurate, a thiocyanurate, urea, thiourea, an alkylene glycol, and a hydrophilic polymeric moiety.

According to some of any of the embodiments of the invention, the hydrophilic group is selected from the group consisting of a heteroatom, a carboxylate, a heteroalicyclic, an alkylene glycol and a hydrophilic oligomeric or polymeric moiety.

According to some of any of the embodiments of the invention, the hydrophilic mono-functional curable material is represented by Formula I:

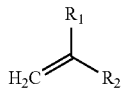

Formula I wherein at least one of $R_1$ and $R_2$ is the hydrophilic group.

According to some of any of the embodiments of the invention, the hydrophilic multi-functional curable material is selected from a hydrophilic di-functional curable material, tri-functional curable material and tetra-functional curable material.

According to some of any of the embodiments of the invention, the at least one hydrophilic multi-functional curable material comprises a hydrophilic oligomeric or polymeric moiety.

According to some of any of the embodiments of the invention, the hydrophilic multi-functional curable material is represented by Formula II:

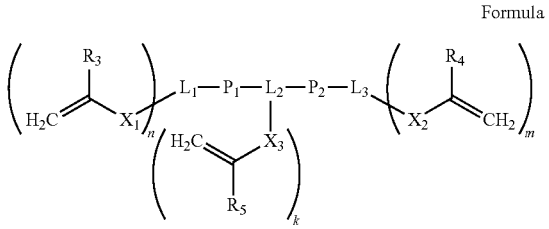

Formula II wherein:
each of $R_3$, $R_4$ and $R_5$ is independently hydrogen, (C1-4) alkyl, or the hydrophilic group;
each of $L_1$, $L_2$ and $L_3$ is independently a linking moiety or absent;
each of $P_1$ and $P_2$ is independently the hydrophilic group or absent; and
each of n, m and k is 0, 1, 2, 3 or 4,
provided that n+m+k is at least 2, and provided that at least one of $R_3$, $R_4$, $R_5$, $P_1$ and $P_2$ is the hydrophilic group.

According to some of any of the embodiments of the invention, at least one of $P_1$ and $P_2$ is a hydrophilic oligomeric or polymeric moiety.

According to some of any of the embodiments of the invention, the hydrophilic oligomeric or polymeric moiety comprises a poly(alkylene glycol).

According to some of any of the embodiments of the invention, the uncured modeling formulation further comprises at least one additional mono-functional curable material and/or multi-functional curable material.

According to some of any of the embodiments of the invention, a concentration of the at least one additional mono-functional curable material and/or multi-functional curable material is no more than 50 weight percents of the total weight of the uncured modeling formulation.

According to some of any of the embodiments of the invention, the concentration of the at least one material is no more than 40 weight percents of the total weight of the uncured modeling formulation.

According to some of any of the embodiments of the invention, the at least one additional curable material comprises at least one multi-functional curable material, the curable material being selected from a monomeric curable material, an oligomeric curable material and a mixture thereof.

According to some of any of the embodiments of the invention, the at least one additional curable material comprises a monomeric multi-functional curable material, and wherein a concentration of the monomeric multi-functional curable material ranges from 10 to 40 weight percents of the total weight of the uncured modeling formulation.

According to some of any of the embodiments of the invention, a concentration of the monomeric multi-functional curable material ranges from 20 to 30 weight percents of the total weight of the uncured modeling formulation.

According to some of any of the embodiments of the invention, the at least one additional curable material comprises an oligomeric multi-functional curable material, and wherein a concentration of the oligomeric curable material is lower than 30 weight percents weight percents of the total weight of the uncured modeling formulation.

According to some of any of the embodiments of the invention, the uncured modeling formulation is devoid of a hydrophobic mono-functional curable material.

According to some of any of the embodiments of the invention, the uncured modeling formulation is devoid of an oligomeric multi-functional curable material.

According to some of any of the embodiments of the invention, each of the curable materials is a UV-curable material.

According to some of any of the embodiments of the invention, each of the curable materials polymerizes by radical polymerization.

According to some of any of the embodiments of the invention, the uncured modeling formulation further comprises an initiator (e.g., a photoinitiator).

According to some of any of the embodiments of the invention, the uncured modeling formulation further comprises at least one agent selected from the group consisting of a surface active agent, a stabilizer, a filler, a pigment, and a dispersant.

According to an aspect of some embodiments of the present invention there is provided an object fabricated by a method as described in any one of the respective embodiments herein and any combination thereof.

According to some of any of the embodiments of the invention, at least a part of the object is characterized by a water absorbance of at least 5%.

According to some of any of the embodiments of the invention, the water absorption ranges from 5% to 30%.

According to some of any of the embodiments of the invention, at least a part of the object is characterized by HDT higher than 40° C. and an impact resistance higher than 20 J/m.

According to an aspect of some embodiments of the present invention there is provided a 3D printed object, wherein at least a part of the object is characterized by: a water absorbance of at least 5%; HDT higher than 40° C.; and an impact resistance higher than 20 J/m.

According to an aspect of some embodiments of the present invention there is provided a uncured modeling formulation useful for fabricating an object by an additive manufacturing process, the formulation comprising at least one hydrophilic mono-functional curable material and/or at least one hydrophilic multi-functional curable material, as described herein for any of the respective embodiments and any combination thereof, and wherein a total concentration of the at least one hydrophilic mono-functional curable material and the at least one hydrophilic multi-functional curable material is at least 50 weight percents of the total weight of the uncured modeling formulation, as described herein for any of the respective embodiments and any combination thereof.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 2:
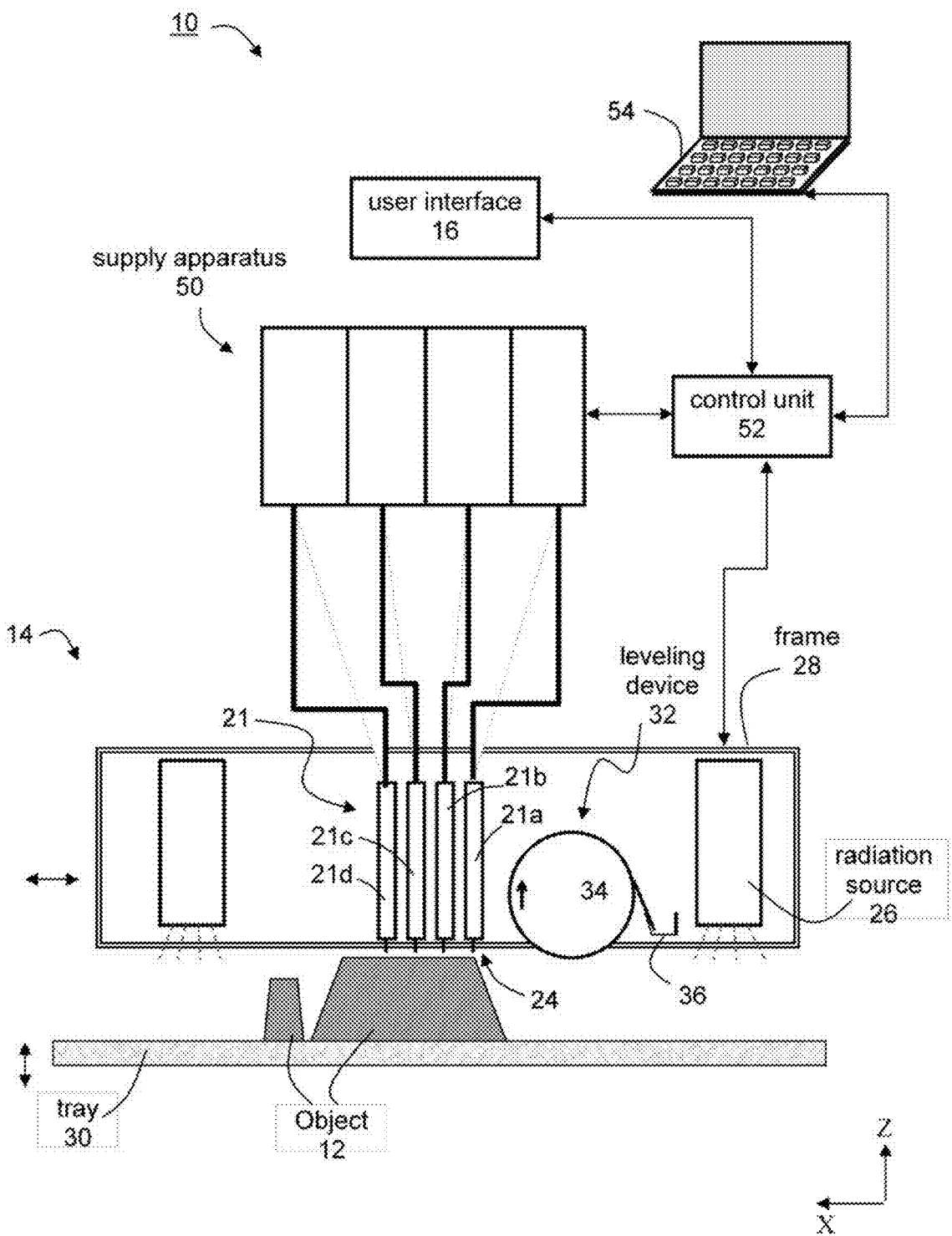
Figure 3:
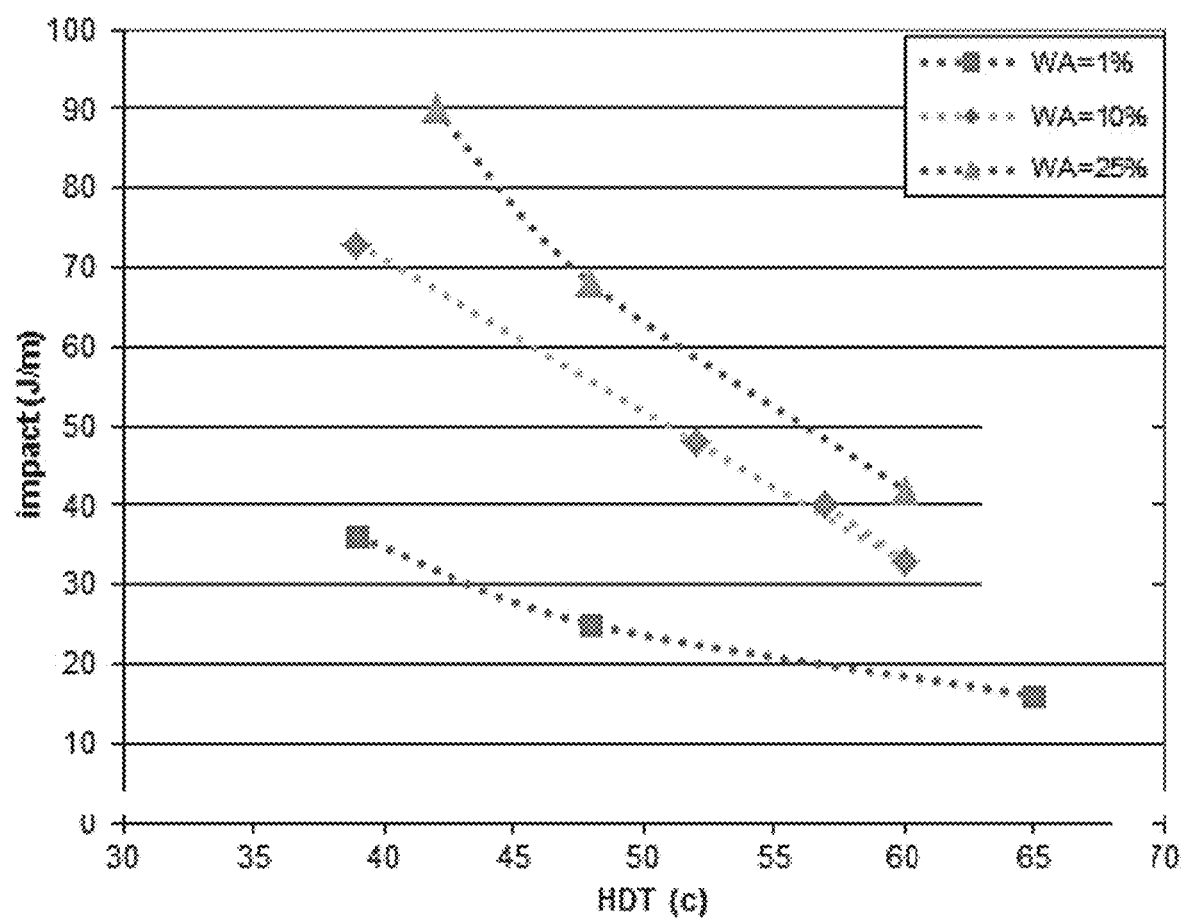

In the drawings:

FIG. 1 is a flowchart diagram of a method suitable for fabricating an object by additive manufacturing according to aspects of some embodiments of the present invention;

FIG. 2 is a schematic illustration of a system usable for fabricating an object by three-dimensional (3D) inkjet printing according to exemplary embodiments of the present invention; and FIG. 3 presents comparative plots showing a correlation between HDT and toughness (Impact) of 3D-printed specimens obtained using formulations having low water absorption of about 1% (rectangles), and of exemplary formulations according to embodiments of the present invention, having water absorption of 10% (diamonds) and 25% (triangles).

DESCRIPTION OF SPECIFIC EMBODIMENTS OF THE INVENTION

The present invention, in some embodiments thereof, relates to Additive Manufacturing (AM) of an object, more particularly, but not exclusively, to a composition and method for additive manufacturing of an object which exhibits desirable mechanical properties.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As discussed hereinabove, currently available modeling material formulations for additive manufacturing processes such as 3D inkjet printing and stereolithography, exhibit an inverse relationship between HDT and toughness. While rigid objects fabricated from such formulations are desirably required to exhibit both high HDT values and high toughness (high impact resistance), an inverse correlation typically exists between these traits such that formulations that exhibit higher HDT values are characterized by relatively low impact resistance and vice versa.

The present inventors have now designed and successfully prepared and practiced modeling material formulations which result in cured materials (e.g., 3D objects or parts thereof) that exhibit unprecedented combination of high HDT and high impact resistance, and hence are characterized by exceptional mechanical performance.

Surprisingly, the exceptional mechanical performance of the fabricated objects is obtained while using formulations that provide cured materials which are characterized by high water absorbance.

As would be recognized by persons skilled in the art, UV-cured compositions that are characterized by high water absorbance (WA), e.g. higher than 5%, are expected to suffer from relatively low dimensional stability at room temperature, over time, and have therefore been considered, heretofore, less suitable for use as modeling materials for additive manufacturing.

Without being bound by any particular theory, it is assumed that the high toughness exhibited by cured compositions characterized by high water absorption results from interactions of water molecules that are present in the printed matrix. Such water molecules may exist in the printed matrix as a result of, for example, environmental humidity.

Herein throughout and in the art, the phrase "water absorption", which is used herein and in the art interchangeably as "water absorbance", whereby both these phrases are abbreviated herein as WA, describes an amount of water, that a material is capable of absorbing, relative to its weight, when immersed in water at room temperature, for 24 hours. According to some embodiments of the invention, water absorption of a sample is determined according to ASTM D57098, as described, for example, in the Examples section that follows. The values described herein for water absorbance represent the increase, in weight percent, of the material upon immersion in water at room temperature, for 24 hours, as described herein. More specifically, these values are calculated as a weight of a material after being immersed in water, as described herein minus a weight of the material after drying/a weight of material after drying×100.

Herein throughout and in the art, the phrase "impact resistance", which is also referred to interchangeably, herein and in the art, as "impact strength" or simply as "impact", describes the resistance of a material to fracture by a mechanical impact, and is expressed in terms of the amount of energy absorbed by the material before complete fracture. Impact resistance can be measured using, for example, the ASTM D256-06 standard Izod impact testing (also known as "Izod notched impact", or as "Izod impact"), and is expressed as J/m.

Herein throughout and in the art, the phrase "heat deflection temperature", or HDT, describes the temperature at which a specimen of cured material deforms under a specified load. Determination of HDT can be performed using the procedure outlines in ASTM D648-06/D648-07.

Herein throughout, some embodiments of the present invention are described in the context of the additive manufacturing being a 3D inkjet printing. However, other additive manufacturing processes, such as, but not limited to, SLA and DLP, are contemplated.

The Method:

According to aspects of some embodiments of the present invention, there is provided a method of additive manufacturing of a three-dimensional object. According to embodiments of these aspects, the method is effected by sequentially forming a plurality of layers in a configured pattern corresponding to the shape of the object, thereby forming the object. According to embodiments of these aspects, formation of each layer is effected by dispensing at least one uncured building material, and exposing the dispensed building material to curing energy to thereby form a cured modeling material.

According to some of any of the embodiments of any of the aspects described herein, the additive manufacturing is preferably by three-dimensional inkjet printing.

Herein throughout, the phrase "uncured building material" collectively describes the materials that are dispensed to sequentially form the layers, as described herein. This phrase encompasses uncured materials dispensed so as to form the object, namely, one or more uncured modeling material formulation(s), and uncured materials dispensed so as to form the support, namely uncured support material formulations.

Herein throughout, the term "object" describes a final product of the additive manufacturing. This term refers to the product obtained by a method as described herein, after removal of the support material, if such has been used as part of the uncured building material. The "object" therefore essentially consists (at least 95 weight percents) of a cured modeling material.

The term "object" as used herein throughout refers to a whole object or a part thereof.

Herein throughout, the phrase "cured modeling material" describes the part of the building material that forms the object, as defined herein, upon exposing the dispensed building material to curing, and, optionally, if a support material has been dispensed, removal of the cured support material, as described herein. The cured modeling material can be a single cured material or a mixture of two or more cured materials, depending on the modeling material formulations used in the method, as described herein.

The phrase "cured modeling material" can be regarded as a cured building material wherein the building material consists only of a modeling material formulation (and not of a support material formulation). That is, this phrase refers to the portion of the building material, which is used to provide the final object.

The phrase "cured modeling material" is also referred to herein as "cured composition".

Herein throughout, the phrase "modeling material formulation", which is also referred to herein interchangeably as "modeling formulation" or simply as "formulation", describes a part or all of the uncured building material which is dispensed so as to form the object, as described herein. The modeling formulation is an uncured modeling formulation, which, upon exposure to curing energy, forms the object or a part thereof.

In some embodiments of the present invention, a modeling material formulation is formulated for use in additive manufacturing, preferably three-dimensional inkjet printing and is able to form a three-dimensional object on its own, i.e., without having to be mixed or combined with any other substance.

An uncured building material can comprise one or more modeling formulations, and can be dispensed such that different parts of the object are made upon curing different modeling formulations, and hence are made of different cured modeling materials or different mixtures of cured modeling materials.

The method of the present embodiments manufactures three-dimensional objects in a layerwise manner by forming a plurality of layers in a configured pattern corresponding to the shape of the objects.

Each layer is formed by an additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material, and which type of building material is to be delivered thereto. The decision is made according to a computer image of the surface.

When the AM is by three-dimensional printing, an uncured building material, as defined herein, is dispensed from a dispensing head having a set of nozzles to deposit building material in layers on a supporting structure. The AM apparatus thus dispenses building material in target locations which are to be occupied and leaves other target locations void. The apparatus typically includes a plurality of dispensing heads, each of which can be configured to dispense a different building material. Thus, different target locations can be occupied by different building materials (e.g., a modeling formulation and/or a support formulation, as defined herein).

The final three-dimensional object is made of the modeling material or a combination of modeling materials or a combination of modeling material/s and support material/s or modification thereof (e.g., following curing). All these operations are well-known to those skilled in the art of solid freeform fabrication.

In some exemplary embodiments of the invention an object is manufactured by dispensing a building material that comprises two or more different modeling material formulations, each modeling material formulation from a different dispensing head of the AM apparatus. The modeling material formulations are optionally and preferably deposited in layers during the same pass of the printing heads. The modeling material formulations and/or combination of formulations within the layer are selected according to the desired properties of the object.

FIG. 1 presents a flowchart describing an exemplary method according to some embodiments of the present invention. The method begins at 100 and optionally and preferably continues to 101 at which 3D printing data corresponding to the shape of the object are received. The data can be received, for example, from a host computer which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

The method continues to 102 at which droplets of the uncured building material as described herein are dispensed in layers, on a receiving medium, using at least two different multi-nozzle inkjet printing heads, according to the printing data. The receiving medium can be a tray of a three-dimensional inkjet system or a previously deposited layer. The uncured building material comprises at least one modeling formulation that when cured forms a cured modeling material that is characterized by water absorbance of at least 5%, as described herein for any of the respective embodiments and any combination thereof.

In some embodiments of the present invention, the dispensing 102 is effected under ambient environment.

Optionally, before being dispensed, the uncured building material, or a part thereof (e.g., one or more formulations of the building material), is heated, prior to being dispensed. These embodiments are particularly useful for uncured building material formulations having relatively high viscosity at the operation temperature of the working chamber of a 3D inkjet printing system. The heating of the formulation(s) is preferably to a temperature that allows jetting the respective formulation through a nozzle of a printing head of a 3D inkjet printing system. In some embodiments of the present invention, the heating is to a temperature at which the respective formulation exhibits a viscosity of no more than X centipoises, where X is about 30 centipoises, preferably about 25 centipoises and more preferably about 20 centipoises, or 18 centipoises, or 16 centipoises, or 14 centipoises, or 12 centipoises, or 10 centipoises.

The heating can be executed before loading the respective formulation into the printing head of the 3D printing system, or while the formulation is in the printing head or while the composition passes through the nozzle of the printing head.

In some embodiments, the heating is executed before loading of the respective composition into the printing head, so as to avoid clogging of the printing head by the composition in case its viscosity is too high.

In some embodiments, the heating is executed by heating the printing heads, at least while passing the first and/or second composition through the nozzle of the printing head.

Once the uncured building material is dispensed on the receiving medium according to the 3D printing data, the method optionally and preferably continues to 103 at which curing energy is applied to the deposited layers. Preferably, the curing is applied to each individual layer following the deposition of the layer and prior to the deposition of the previous layer.

In some embodiments, applying a curing energy is effected under a generally dry and inert environment, as described herein.

The method ends at 16.

A representative and non-limiting example of a system 10 suitable for AM of an object 12 according to some embodiments of the present invention is illustrated in FIG. 2. System 10 comprises an additive manufacturing apparatus 14 having a dispensing unit 21 which comprises a plurality of dispensing heads. Each head preferably comprises an array of one or more nozzles (not shown), through which a liquid building material 24 is dispensed.

Preferably, but not obligatorily, apparatus 14 is a three-dimensional inkjet printing apparatus, in which case the dispensing heads are inkjet printing heads, and the building material is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, binder jet powder based apparatus, fused deposition modeling apparatus and fused material deposition apparatus.

Each dispensing head is optionally and preferably fed via one or more building material reservoir(s) which may optionally include a temperature control unit (e.g., a temperature sensor and/or a heating device), and a material level sensor. To dispense the building material, a voltage signal is applied to the dispensing heads to selectively deposit droplets of material via the dispensing head nozzles, for example, as in piezoelectric inkjet printing technology. The dispensing rate of each head depends on the number of nozzles, the type of nozzles and the applied voltage signal rate (frequency). Such dispensing heads are known to those skilled in the art of solid freeform fabrication.

Optionally, but not obligatorily, the overall number of dispensing nozzles or nozzle arrays is selected such that half of the dispensing nozzles are designated to dispense support material formulations and half of the dispensing nozzles are designated to dispense modeling material formulations, i.e. the number of nozzles jetting modeling materials is the same as the number of nozzles jetting support material. In the representative example of FIG. 2, four dispensing heads 21a, 21b, 21c and 21d are illustrated. Each of heads 21a, 21b, 21c and 21d has a nozzle array. In this Example, heads 21a and 21b can be designated for modeling material formulation(s) and heads 21c and 21d can be designated for support material formulation. Thus, head 21a can dispense a first modeling material formulation, head 21b can dispense a second modeling material formulation and heads 21c and 21d can both dispense support material formulation. In an alternative embodiment, heads 21c and 21d, for example, may be combined in a single head having two nozzle arrays for depositing support material formulation.

Yet it is to be understood that it is not intended to limit the scope of the present invention and that the number of modeling material depositing heads (modeling heads) and the number of support material depositing heads (support heads) may differ. Generally, the number of modeling heads, the number of support heads and the number of nozzles in each respective head or head array are selected such as to provide a predetermined ratio, a, between the maximal dispensing rate of the support material and the maximal dispensing rate of modeling material. The value of the predetermined ratio, a, is preferably selected to ensure that in each formed layer, the height of modeling material equals the height of support material. Typical values for a are from about 0.6 to about 1.5.

For example, for a=1, the overall dispensing rate of support material formulation is generally the same as the overall dispensing rate of the modeling material formulation (s) when all modeling heads and support heads operate.

In a preferred embodiment, there are M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material level sensor of its own, and receives an individually controlled voltage for its operation.

Apparatus 14 can further comprise a curing unit which can comprise one or more curing energy sources. The curing energy source can be, for example, a radiation source, such as an ultraviolet or visible or infrared lamp, or other sources of electromagnetic radiation, or electron beam source, depending on the modeling material formulation(s) being used. The curing energy source serves for curing or solidifying the modeling material formulation(s). In the representative illustration of FIG. 2, which is not to be considered as limiting, the curing energy source is illustrated as a radiation source 26.

The dispensing head and curing energy source (e.g., radiation source) source are preferably mounted in a frame or block 28 which is preferably operative to reciprocally move over a tray 30, which serves as the working surface. In some embodiments of the present invention, the curing energy (e.g., radiation) sources are mounted in the block such that they follow in the wake of the dispensing heads to at least partially cure or solidify the materials just dispensed by the dispensing heads. According to the common conventions, tray 30 is positioned in the X-Y plane. Tray 30 is preferably configured to move vertically (along the Z direction), typically downward. In various exemplary embodiments of the invention, apparatus 14 further comprises one or more leveling devices 32, e.g. a roller 34. Leveling device 32 serves to straighten, level and/or establish a thickness of the newly formed layer prior to the formation of the successive layer thereon. Leveling device 32 preferably comprises a waste collection device 36 for collecting the excess material generated during leveling. Waste collection device 36 may comprise any mechanism that delivers the material to a waste tank or waste cartridge.

In use, the dispensing heads of unit 21 move in a scanning direction, which is referred to herein as the X direction, and selectively dispense building material in a predetermined configuration in the course of their passage over tray 30. The building material typically comprises one or more types of support material formulations and one or more types of modeling material formulations. The passage of the dispensing heads of unit 21 is followed by the curing of the modeling material formulation(s) by the curing energy (e.g., radiation) source (e.g., curing energy source 26). In the reverse passage of the heads, back to their starting point for the layer just deposited, an additional dispensing of building material may be carried out, according to predetermined configuration. In the forward and/or reverse passages of the dispensing heads, the layer thus formed may be straightened by leveling device 32, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 30 is lowered in the Z direction to a predetermined Z level, according to the desired thickness of the layer subsequently to be printed. The procedure is repeated to form three-dimensional object 12 in a layerwise manner.

In some embodiments, tray 30 may be displaced in the Z direction between forward and reverse passages of the dispensing head of unit 21, within the layer. Such Z displacement is carried out in order to cause contact of the leveling device with the surface in one direction and prevent contact in the other direction.

System 10 optionally and preferably comprises a building material supply apparatus 50 which comprises the building material containers or cartridges and supplies a plurality of building material formulations to fabrication apparatus 14.

A control unit 52 controls fabrication apparatus 14 and optionally and preferably also supply apparatus 50. Control unit 52 preferably communicates with a data processor 54 which transmits digital data pertaining to fabrication instructions based on computer object data, stored on a computer readable medium, preferably a non-transitory medium, in a form of a Standard Tessellation Language (STL) format or any other format such as, but not limited to, the aforementioned formats. Typically, control unit 52 controls the voltage applied to each dispensing head or nozzle array and the temperature of the building material in the respective printing head.

Once the manufacturing data is loaded to control unit 52 it can operate without user intervention. In some embodiments, control unit 52 receives additional input from the operator, e.g., using data processor 54 or using a user interface 16 communicating with unit 52. User interface 16 can be of any type known in the art, such as, but not limited to, a keyboard, a touch screen and the like. For example, control unit 52 can receive, as additional input, one or more building material types and/or attributes, such as, but not limited to, color, characteristic distortion and/or transition temperature, viscosity, electrical property, magnetic property. Other attributes and groups of attributes are also contemplated.

Some embodiments contemplate the fabrication of an object by dispensing different formulations from different dispensing heads. These embodiments provide, inter alia, the ability to select formulations from a given number of formulations and define desired combinations of the selected formulations and their properties. According to the present embodiments, the spatial locations of the deposition of each formulation with the layer is defined, either to effect occupation of different three-dimensional spatial locations by different formulations, or to effect occupation of substantially the same three-dimensional location or adjacent three-dimensional locations by two or more different formulations so as to allow post deposition spatial combination of the formulations within the layer.

The present embodiments thus enable the deposition of a broad range of material combinations, and the fabrication of an object which may consist of multiple different combinations of modeling material formulations, in different parts of the object, according to the properties desired to characterize each part of the object.

Further details on the principles and operations of an AM system such as system 10 is found in U.S. Patent Application having Publication No. 2013/0073068, the contents of which are hereby incorporated by reference.

According to some embodiments of each of the methods described herein, the uncured building material comprises at least one modeling formulation which is selected such that a cured modeling material obtained upon curing the formulation is characterized by water absorption of at least 5%.

According to some of any of the embodiments described herein, the uncured building material comprises a modeling formulation which is selected such that a cured modeling material made therefrom upon exposure of the formulation to curing energy (e.g., a 3D object or a part thereof) is characterized by water absorption that ranges from about 5% to about 30%, or from about 5% to about 25%, or from about 5% to about 20%.

According to some of any one of the embodiments described herein, the uncured building material comprises a modeling formulation which is selected such that a cured modeling material made therefrom upon exposure of the formulation to curing energy (e.g., in a 3D object or a part thereof) is characterized by water absorption of 5%, 6%, 6.5%, 7%, 8%, 9%, 10%, 11%, 12%, 13%, 14%, 15%, 16%, 17%, 18%, 19%, 20%, 21%, 22%, 23%, 24% or 25%, including any intermediate value and subranges of these values. Higher values, for example, WA of 26%, 27%, 28%, 29% or 30%, are also contemplated.

It is to be noted that a cured modeling material (e.g., in the 3D object or a part thereof) which is characterized by a water absorbance as described herein, and which is obtained by any of the embodiments of the method as described herein, is characterized as being capable of absorbing the indicated about of water (e.g., at least 5% of its weight), when immersed in water for determining its water absorbance as described herein. However, the obtained cured modeling material that forms the object or a part thereof does not necessarily contain the maximal amount of water it can absorb, but is rather at equilibrium with its environment, and absorbs an amount of water that correlates to the humidity of its environment.

In some of any of the embodiments described herein, the uncured building material comprises a modeling formulation which is selected such that a cured modeling material made therefrom upon exposure of the formulation to curing energy (e.g., in the object or a part thereof), when in equilibrium with an environment of up to 90% humidity, comprises, or is capable of absorbing water in an amount of from about 0.5 to about 4.5 weight percents, or from about 1 to about 3 weight percents, of the total weight of the object.

As discussed hereinabove, the present inventors have surprisingly uncovered that by employing modeling formulations that upon curing form a cured modeling material which is characterized by high water absorbance, as described herein, form a cured modeling material that is further characterized by an improved balance of mechanical characteristics, namely, by high impact resistance and high HDT.

Reference is made in this regard, for example, to FIG. 3, which presents the correlation between HDT and toughness (Impact resistance) of 3D-printed objected. As shown therein, an inverse correlation exists for a formulation characterized by WA of 1%, such that at a desirable HDT range, lower impact values are exhibited, and the higher the HDT is, the lower is the impact resistance. However, formulations characterized by higher water absorption feature a substantially improved balance of these properties. In these formulations, the toughness at a given HDT is higher compared to the low WA composition, and the HDT for a given toughness value is higher compared to the low WA formulations.

According to some of any of the embodiments described herein, the uncured building material comprises a modeling formulation which is selected such that a cured modeling material (e.g., in the object or a part thereof) is characterized by HDT higher than 40° C. and an impact resistance higher than 20 J/m. According to some of any of the embodiments described herein, the cured modeling material obtained upon curing the modeling formulation is characterized by HDT higher than 45° C.

According to some of any of the embodiments described herein, the cured modeling material obtained upon curing the modeling formulation is characterized by HDT in the range of from 45° C. to 65° C., or from 45° C. to 60° C.

According to some of any of the embodiments described herein, the cured modeling material obtained upon curing the modeling formulation is characterized by HDT of 45, 46, 47, 48, 49, 50, 51, 52, 53, 54, 55, 56, 57, 58, 59 or 60° C., including any intermediate value and subranges of these values. Higher values, for example, HDT of 61, 62, 63, 64, 65, or higher, are also contemplated, as long as the impact resistance of the cured material is maintained higher than 20 J/m, as described herein.

According to some of any of the embodiments described herein, the cured modeling material obtained upon curing the modeling formulation is characterized by an impact resistance higher that ranges from 25 to 70 J/m, or from 30 to 70 J/m, or from 40 to 70 kJ/m.

According to some of any of the embodiments described herein, the cured modeling material obtained upon curing the modeling formulation is characterized by an impact resistance of 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69 or 70 J/m, including any intermediate value and subranges of these values. Higher values of impact resistance are also contemplated, as long as the HDT of the cured material is maintained higher than 40° C., as described herein.

In some of any of the embodiments described herein, the cured modeling material obtained upon curing the modeling formulation is characterized by water absorbance of from 5% to 20%, HDT of at least 45° C., and an impact resistance of at least 25 J/m.

In some of any of the embodiments described herein, the cured modeling material obtained upon curing the modeling formulation is characterized by water absorbance of from 5% to 20%, HDT of from 45 to 60° C., and an impact resistance of from 25 J/m to 70 J/m.

In some of any of the embodiments described herein, the cured modeling material obtained upon curing the modeling formulation is characterized by water absorbance of from 5% to 20%, HDT of from 45 to 60° C., and an impact resistance of from 30 J/m to 70 J/m.

It is to be noted that the HDT and impact resistance values described herein throughout for the cured modeling material obtained upon curing the modeling formulation represent values obtained for a cured modeling material at ambient environment, which is characterized by the indicated WA, but does not necessarily includes the amount of water it is capable of absorbing when immersed in water for 24 hours at room temperature.

The Modeling Material Formulation:

As discussed hereinabove, the present inventors have uncovered that by employing modeling formulations that upon curing (e.g., upon exposure to curing energy as defined herein) form a cured modeling material which is characterized by water absorbance of at least 5%, as described herein, a cured modeling material that is further characterized by an improved balance of mechanical characteristics, namely, by high impact resistance and high HDT, is obtained.

The present inventors have successfully practiced modeling material formulations which are usable in any of the methods described herein, and any of the embodiments thereof. The modeling material formulations as described herein are therefore useful for fabricating an object by an additive manufacturing process, preferably by a three-dimensional inkjet printing process.

According to an aspect of some embodiments of the present invention there is provided an uncured modeling material formulation, which, upon exposure to curing energy, as described herein, forms a cured modeling material that is characterized by water absorbance of at least 5%, as described herein in any of the respective embodiments.

According to some embodiments of this aspect of the present invention, the modeling material formulation is such that forms, upon exposure to curing energy, as described herein, a cured modeling material that is further characterized by HDT higher than 40° C. and an impact resistance higher than 20 J/m.

According to some embodiments of this aspect of the present invention, the modeling material formulation is such that forms, upon exposure to curing energy, as described herein, a cured modeling material that is characterized by water absorbance of from 5% to 20%, HDT of at least 45° C., and an impact resistance of at least 25 k J/m.

According to some embodiments of this aspect of the present invention, the modeling material formulation is such that forms, upon exposure to curing energy, as described herein, a cured modeling material that is characterized by water absorbance of from 5% to 20%, HDT of from 45 to 60° C., and an impact resistance of from 25 J/m to 70 J/m.

According to some embodiments of this aspect of the present invention, the modeling material formulation is such that forms, upon exposure to curing energy, as described herein, a cured modeling material that is characterized by water absorbance of from 5% to 20%, HDT of from 45 to 60° C., and an impact resistance of from 30 J/m to 70 J/m.

Determining if a modeling formulation forms a cured modeling material that is characterized by the indicated water absorbance, HDT and/or impact resistance, as described herein for any of the respective embodiments, is well within the knowledge of persons skilled in the art, and can be made by using ASTM procedures such as those described herein.

The present inventors have demonstrated that a desirable water absorbance of at least 5% of a cured modeling material can be obtained upon manipulating the hydrophilicity of the modeling formulation employed for forming the cured modeling material.

According to an aspect of some embodiments of the present invention, there is provided a modeling material formulation which comprises one or more of a hydrophilic mono-functional curable material(s) and/or a hydrophilic multi-functional curable material, collectively referred to herein also as "hydrophilic curable materials", wherein a total concentration of the hydrophilic mono-functional and multi-functional curable material(s) is at least 50 weight percents of the total weight of the modeling formulation (an uncured modeling formulation, as described herein).

According to an aspect of some embodiments of the present invention, there is provided a method of additive manufacturing of a three-dimensional object, which employs an uncured building material that comprises an uncured modeling formulation, as described herein in any of the respective embodiments and any combination thereof.

According to an aspect of some embodiments of the present invention there is provided a method of additive manufacturing of a three-dimensional object, the method comprising sequentially forming a plurality of layers in a configured pattern corresponding to the shape of the object, wherein the formation of each layer comprises dispensing at least one uncured building material, and exposing the dispensed building material to curing energy to thereby form a cured modeling material, and wherein the uncured building material comprises an uncured modeling formulation which comprises one or more of a hydrophilic mono-functional curable material(s) and/or a hydrophilic multi-functional curable material, wherein a total concentration of the hydrophilic mono-functional and multi-functional curable material(s) is at least 50 weight percents of the total weight of the modeling formulation (an uncured modeling formulation, as described herein).

According to some of any of the embodiments described herein, the cured modeling material obtained upon curing the formulation is characterized by water absorption of at least 5%, as described herein for any of the respective embodiments, and can be further characterized by HDT and impact resistance as described herein for any of the respective embodiments.

Herein throughout, a "curable material" is a compound (monomeric or oligomeric compound) which, when exposed to curing energy, as described herein, solidifies or hardens to form a cured modeling material as defined herein. Curable materials are typically polymerizable materials, which undergo polymerization and/or cross-linking when exposed to suitable energy source.

In some of any of the embodiments described herein, a curable material is a photopolymerizable material, which polymerizes or undergoes cross-linking upon exposure to radiation, as described herein, and in some embodiments the curable material is a UV-curable material, which polymerizes or undergoes cross-linking upon exposure to UV-vis radiation, as described herein.

In some embodiments, a curable material as described herein is a polymerizable material that polymerizes via photo-induced radical polymerization.

In some of any of the embodiments described herein, a curable material can be a monomer, an oligomer or a short-chain polymer, each being polymerizable as described herein.

In some of any of the embodiments described herein, when a curable material is exposed to curing energy (e.g., radiation), it polymerizes by any one, or combination, of chain elongation and cross-linking.

In some of any of the embodiments described herein, a curable material is a monomer or a mixture of monomers which can form a polymeric modeling material upon a polymerization reaction, when exposed to curing energy at which the polymerization reaction occurs. Such curable materials are also referred to herein as monomeric curable materials.

In some of any of the embodiments described herein, a curable material is an oligomer or a mixture of oligomers which can form a polymeric modeling material upon a polymerization reaction, when exposed to curing energy at which the polymerization reaction occurs. Such curable materials are also referred to herein as oligomeric curable materials.

In some of any of the embodiments described herein, a curable material, whether monomeric or oligomeric, can be a mono-functional curable material or a multi-functional curable material.

Herein, a mono-functional curable material comprises one functional group that can undergo polymerization when exposed to curing energy (e.g., radiation).

A multi-functional curable material comprises two or more, e.g., 2, 3, 4 or more, functional groups that can undergo polymerization when exposed to curing energy. Multi-functional curable materials can be, for example, di-functional, tri-functional or tetra-functional curable materials, which comprise 2, 3 or 4 groups that can undergo polymerization, respectively. The two or more functional groups in a multi-functional curable material are typically linked to one another by a linking moiety, as defined herein. When the linking moiety is an oligomeric moiety, the multi-functional group is an oligomeric multi-functional curable material.

As used herein throughout, the term "hydrophilic" describes a physical property of a compound or a portion of a compound (e.g., a chemical group in a compound) which accounts for transient formation of bond(s) with water molecules, typically through hydrogen bonding.

A hydrophilic compound or portion of a compound (e.g., a chemical group in a compound) is one that is typically charge-polarized and capable of hydrogen bonding.

Hydrophilic compounds or groups typically include one or more electron-donating heteroatoms which form strong hydrogen bonds with water molecules. Such heteroatoms include, but are not limited to, oxygen and nitrogen. Preferably, a ratio of the number of carbon atoms to a number of heteroatoms in a hydrophilic compounds or groups is 10:1 or lower, and can be, for example, 8:1, more preferably 7:1, 6:1, 5:1 or 4:1, or lower. It is to be noted that hydrophilicity of compounds and groups may result also from a ratio between hydrophobic and hydrophilic moieties in the compound or chemical group, and does not depend solely on the above-indicated ratio.

Hydrophilic compounds dissolve more readily in water than in oil or other hydrophobic solvents. Hydrophilic compounds can be determined by, for example, as having Log P lower than 0.5, when Log P is determined in octanol and water phases.

A hydrophilic compound can have one or more hydrophilic groups that render the compound hydrophilic. Such groups are typically polar groups, comprising one or more electron-donating heteroatoms such as oxygen and nitrogen. The hydrophilic group can be, for example, one or more substituent(s) of a monomeric mono-functional curable material or two or more substituents or interrupting groups of an oligomeric mono-functional curable material. The hydrophilic group can be, for example, one or more substituent(s) of a monomeric multi-functional curable material or one or more substituents or interrupting groups of a linking moiety of a monomeric multi-functional curable moiety. The hydrophilic group can be, for example, two or more substituents or interrupting groups of an oligomeric linking moiety in oligomeric multi-functional curable material.

Exemplary hydrophilic groups include, but are not limited to, an electron-donating heteroatom, a carboxylate, a thiocarboxylate, oxo (=O), a linear amide, hydroxy, a (C1-4) alkoxy, an (C1-4)alcohol, a heteroalicyclic (e.g., having a ratio of carbon atoms to heteroatoms as defined herein), a cyclic carboxylate such as lactone, a cyclic amide such as lactam, a carbamate, a thiocarbamate, a cyanurate, an isocyanurate, a thiocyanurate, urea, thiourea, an alkylene glycol (e.g., ethylene glycol or propylene glycol), and a hydrophilic polymeric or oligomeric moiety, as these terms are defined hereinunder, and any combinations thereof (e.g., a hydrophilic group that comprises two or more of the indicated hydrophilic groups).

In some embodiments, the hydrophilic group is, or comprises, an electron donating heteroatom, a carboxylate, a heteroalicyclic, an alkylene glycol and/or a hydrophilic oligomeric moiety.

A hydrophilic polymeric or oligomeric moiety, as used herein, comprises a polymeric chain which comprises hydrophilic groups as defined herein. The hydrophilic groups can be heteroatoms within the backbone chain of the polymeric moiety, as, for example, in poly(alkylene glycols) or hydrophilic pendant groups. A polymeric or oligomeric moiety, according to some embodiments of the present invention, preferably has from 10 to 40 repeating backbone units, more preferably from 10 to 20 repeating backbone units.

According to the present embodiments, a modeling formulation comprises one or more hydrophilic curable materials, which can be mono-functional or multi-functional curable materials as described herein, and each can be independently a monomeric or an oligomeric curable material. The total concentration of hydrophilic curable materials in the modeling formulation is at least 50 weight percents of the total weight of the modeling formulation.

Herein throughout, whenever the phrase "weight percents" is indicated in the context of embodiments of a modeling formulation, it is meant weight percents of the total weight of the uncured modeling formulation that forms a cured modeling material characterized by water absorbance of at least 5%, as defined herein.

It is to be noted that when a building material comprises two or more modeling formulations, the indicated concentration is for the modeling formulation that forms a cured modeling material characterized by water absorbance of at least 5%, as defined herein, and are not to be regarded as a concentration relative to the total weight of all of the modeling formulations used in the manufacturing process.

A hydrophilic mono-functional curable material according to some embodiments of the present invention can be a vinyl-containing compound represented by Formula I:

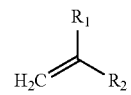

Formula I wherein at least one of $R_1$ and $R_2$ is and/or comprises a hydrophilic group, as defined herein.

The (=CH$_2$) group in Formula I represents a polymerizable group, and is typically a UV-curable group, such that the material is a UV-curable material.

For example, $R_1$ is a hydrophilic group as defined herein and $R_2$ is a non-hydrophilic group, for example, hydrogen, C(1-4) alkyl, C(1-4) alkoxy, or any other substituent, as long as the compound is hydrophilic, as defined herein.

In some embodiments, $R_1$ is a carboxylate, and the compound is a mono-functional acrylate monomer. In some of these embodiments, $R_2$ is methyl, and the compound is mono-functional methacrylate monomer. In other embodiments, $R_2$ is a hydrophilic substituent, namely, a substituent which is, or which comprises, a hydrophilic group as described herein.

In some of any of these embodiments, the carboxylate group, —C(=O)—OR', comprises R' which is a hydrophilic group. Exemplary R' groups include, but are not limited to, heteroalicyclic groups (having a ratio of 5:1 or lower of carbon atoms to electron-donating heteroatoms, such as morpholine, tetrahydrofuran, oxalidine, and the likes), hydroxyl, C(1-4)alkoxy, thiol, alkylene glycol or a polymeric or oligomeric moiety, as described herein. An exemplary monomeric mono-functional acrylate is acryloyl morpholine (ACMO).

In some embodiments, $R_1$ is amide, and in some embodiments, it is a cyclic amide such as lactam, and the compound is a vinyl lactam. In some embodiments, $R_1$ is a cyclic carboxylate such as lactone, and the compound is a vinyl lactone.

When one or both of $R_1$ and $R_2$ comprise a polymeric or oligomeric moiety, for example, a hydrophilic oligomeric moiety, as defined herein, the mono-functional curable compound of Formula I is an exemplary oligomeric mono-functional curable material. Otherwise, it is an exemplary monomeric mono-functional curable material.

Exemplary oligomeric mono-functional curable materials include, but are not limited to, a mono-(meth)acrylated urethane oligomer derivative of polyethylene glycol, a mono-(meth)acrylated polyol oligomer, a mono-(meth)acrylated oligomer having hydrophilic substituents, and a mono-(meth)acrylated polyethylene glycol (e.g., methoxypolyethylene glycol). (Meth)acrylated means that the oligomer or polymer comprises an acrylate or methacrylate functional group.

In some embodiments, $R_1$ is a poly(alkylene glycol), as defined herein.

A hydrophilic multi-functional curable material according to some embodiments of the present invention can be represented by Formula II:

Formula II

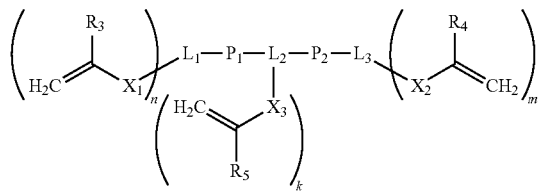

wherein:
each of $R_3$, $R_4$ and $R_5$ is independently hydrogen, C(1-4) alkyl, or a hydrophilic group, as defined herein;
each of $L_1$, $L_2$ and $L_3$ is independently a linking moiety or absent;
each of $P_1$ and $P_2$ is independently a hydrophilic group as defined herein or absent;
each of $X_1$, $X_2$ and $X_3$ is independently C(1-4)alkyl, or a hydrophilic group, as defined herein, or absent; and
each of n, m and k is 0, 1, 2, 3 or 4,
provided that n+m+k is at least 2, and provided that at least one of $R_3$, $R_4$, $R_5$, $X_1$, $X_2$, $X_3$ $P_1$ and $P_2$ is a hydrophilic group, as defined herein.

Multi-functional curable materials of Formula II in which one, two or all of $X_1$, $X_2$ and $X_3$, when present, is oxo, are multi-functional acrylates, which can be further substituted by a hydrophilic group, as described hereinabove. When one or more of $R_3$, $R_4$ and $R_5$, when present, is methyl, the curable materials are multi-functional methacrylates.

Multifunctional curable materials in which one, two or all of $X_1$, $X_2$ and $X_3$, when present, is oxo, can include a combination of acrylate and methacrylate functional moieties.

In some embodiments, the acrylate or methacrylate multifunctional curable material is monomeric, such that none of $P_1$ and $P_2$ is a polymeric or oligomeric moiety. In some of these embodiments, one or both of $P_1$ and $P_2$ is a hydrophilic group as described herein, for example, an alkylene glycol, or any other hydrophilic linking group, or a short chain (e.g., of 1-6 carbon atoms), substituted or unsubstituted hydrocarbon moiety, as defined herein.

In some embodiments, one or both of $P_1$ and $P_2$ is a polymeric or oligomeric moiety as defined herein, and the curable compound is an oligomeric multi-functional curable material, for example, an oligomeric multi-functional acrylate or methacrylate, as described herein for $X_1$, $X_2$ and/or $X_3$. If both $P_1$ and $P_2$ are present, $L_2$ can be, for example, a linking moiety such as a hydrocarbon, comprising alkyl, cycloalkyl, aryl and any combination thereof. Exemplary such curable materials include ethoxylated or methoxylated polyethylene glycol diacrylate, and ethoxylated bisphenol A diacrylate.

Other non-limiting examples include polyethylene glycol diacrylate, polyethylene glycol dimethacrylate, polyethylene glycol-polyethylene glycol urethane diacrylate, and a partially acrylated polyol oligomer.

In some embodiments, one or more of $P_1$ and $P_2$ is, or comprises, a poly(alkylene glycol) moiety, as defined herein.

In some of any of the embodiments of an acrylate or methacrylate multifunctional curable material of Formula II, one or more of $R_3$, $R_4$ and $R_5$ is a hydrophilic group as described, for example, for $R_1$ and $R_2$ in Formula I, herein. In these embodiments, $P_1$ and/or $P_2$ can be present or absent, and can be, or comprise, a hydrophilic group or not, as long as the material is hydrophilic, as defined herein.

Alternatively, one, two or all of $X_1$, $X_2$ and $X_3$, when present, can be —O—, such that at least one functional moiety in the multi-functional curable material is vinyl ether.

In some embodiments, n and m are each 1, k is 0, $X_1$ is O, $X_2$ is absent, and the compound is a vinyl ether, which can be substituted or not. In some of these embodiments, $L_1$, $L_2$, $L_3$, $P_1$ and $P_2$ are absent, and the compound is a monomeric vinyl ether. Examples of monomeric vinyl ethers include ethyl vinyl ether, propyl vinyl ether, isobutyl vinyl ether, cyclohexyl vinyl ether, 2-ethylhexyl vinyl ether, butyl vinyl ether, ethyleneglycol monovinyl ether, diethyleneglycol divinyl ether, butane diol divinyl ether, hexane diol divinyl ether, cyclohexane dimethanol monovinyl ether and the like.

In some embodiments, $P_1$ and $P_2$ are absent, and one of $L_1$ and $L_2$ is an alkylene chain substituted by one or more hydrophilic groups. An exemplary such curable compound is 1,4-cyclohexane dimethanol divinyl ether.

In some embodiments, one or more of $P_1$ and $P_2$ is a hydrophilic polymeric or oligomeric moiety, as defined herein. In some embodiments, one or more of $P_1$ and $P_2$ is, or comprises, a poly(alkylene glycol) moiety, as defined herein. In some embodiments the polymeric moiety is substituted by one or more vinyl ether substituents.

In some of any of the embodiments related to Formula II, one or more of the substituents of the polymerizable group, $R_3$, $R_4$ and $R_5$, can be a hydrophilic group as described for $R_1$ and $R_2$ in Formula I herein.

In some of any of the embodiments related to Formula II, when P1 and P2 is a polymeric or oligomeric moiety, this moiety can comprises hydrophilic heteroatoms as defined herein, within the backbone chain or the backbone chain can be substituted by hydrophilic groups, as described herein.

Any hydrophilic curable compound as described herein and any combination thereof, can form at least 50 weight percent of the modeling material formulation of the present embodiments.

In some of any of the embodiments described herein, the total concentration of the hydrophilic curable material(s) (mono-functional and/or multi-functional) ranges from 50 to 80 weight percents. In some embodiments, the total concentration of the hydrophilic curable material(s) is 50, 52, 56, 58, 60, 70, 75 or 80 weight percents.

In some of any of the embodiments described herein, the hydrophilic curable material comprises a mixture of a mono-functional curable material and a multi-functional curable material, and in some of these embodiments the multi-functional curable material is a di-functional curable material, as described herein in any of the respective embodiments and any combination thereof.

In some of any of the embodiments described herein, the hydrophilic curable material comprises a mixture of a monomeric mono-functional curable material and an oligomeric di-functional curable material.

In some embodiments, a concentration of the monomeric mono-functional curable material ranges from 10 to 60 weight percents, and in some embodiments it ranges from 32 to 53 weight percents.

In some embodiments, a concentration of the oligomeric di-functional curable material ranges from 10 to 60 weight percents, and in some embodiments, it ranges from 20 to 40, or from 20 to 35 weight percents.

According to some of any of the embodiments described herein, each of the hydrophilic curable materials is a monomeric or oligomeric, mono-functional or multi-functional, acrylate or methacrylate, for example, as described herein in any of the respective embodiments.

According to some of any of the embodiments described herein, a hydrophilic curable material as described herein is water-soluble.

According to some of any of the embodiments described herein, the uncured modeling formulation further comprises one or more additional curable materials, which are not hydrophilic curable materials as defined herein. The additional curable materials can comprise one or more mono-functional curable materials and/or one or more multi-functional curable materials.

According to embodiments of the present invention, a concentration of the additional, non-hydrophilic curable materials is no more than 50 weight percents of the total weight of said uncured modeling formulation.

In some embodiments, a concentration of the additional, non-hydrophilic curable materials is no more than 40 weight percents, or no more than 30 weight percents, or even no more than 80 weight percents, of the total weight of said uncured modeling formulation.

Any curable materials that are usable for forming cured modeling materials in AM processes are contemplated in these embodiments.

In some embodiments, the additional curable material(s) comprise one or more multi-functional curable materials. In some embodiments, the multi-functional curable material(s) can be monomeric and/or oligomeric.

Exemplary multi-functional curable materials that are usable in the context of these embodiments include diacrylates such as polyurethane diacrylate oligomer and/or monomeric diacrylates, preferably short chain diacrylates such as, but not limited to, isobornyl diacrylate.

Exemplary multi-functional curable materials can have Formula II as described herein, yet, $R_3$, $R_4$, $R_5$, $P_1$ and $P_2$, when present, are non-hydrophilic groups, or, together result in a non-hydrophilic compound.

Herein throughout, a "non-hydrophilic" compound or group describes a compound or a group that does not fall under the characteristics described herein for "hydrophilic". Such compounds or groups can be, for example, amphiphilic or hydrophobic.

A "hydrophobic" compound, material or group, as described herein, refers to compounds which are characterized by LogP, when measured for water and ethanol, higher than 1, and preferably higher. In some of the any of the embodiments described herein, the additional curable material comprises a monomeric multi-functional curable material, and a concentration of the monomeric multi-functional curable material ranges from 10 to 40, or from 20 to 30 weight percents of the total weight of the modeling formulation.

In some of these embodiments, the additional curable material further comprises an oligomeric multi-functional curable material, and a concentration of the oligomeric curable material is lower than 30 weight percents weight percents of the total weight of said uncured modeling formulation. In some embodiments, the concentration of the oligomeric curable material is lower than 25 weight percents, or lower than 20 weight percents, or even lower. In some embodiments, the modeling formulation is devoid of a non-hydrophilic oligomeric curable material.

In some of any of the embodiments described herein, the modeling formulation is devoid of non-hydrophilic mono-functional curable materials. Alternatively, the modeling formulation comprises a non-hydrophilic mono-functional curable material, and a concentration of the non-hydrophilic mono-functional curable material is no more than 30 weight percents, or no more than 20 weight percents, or no more than 15 weight percents, or no more than 10 weight percents, of the total weight of the formulation.

In some embodiments, a non-hydrophilic mono-functional curable material is a mono-functional curable material which is substituted by a hydrophobic group, for example, an alkyl, cycloalkyl or aryl group, comprising at least 6 carbon atoms.

By "devoid of" it is meant herein throughout, no more than 1 weight percents, or no more than 0.5 weight percent, or no more than 0.1 weight percent, or no more than 0.05 weight percent, or no more than 0.01 weight percent, or completely null.

In some of any of the embodiments described herein, each of the hydrophilic and non-hydrophilic curable materials included in the modeling formulation is a UV-curable material, as defined herein, for example, an acrylate or a methacrylate (mono-functional or multi-functional, monomeric or oligomeric).

In some of any of the embodiments described herein, the modeling formulation is selected so as to exhibit a viscosity that is suitable for the selected AM procedure.

In some embodiments, the modeling formulation is selected so as to exhibit a viscosity that is suitable for 3D inkjet printing.

In exemplary embodiments, the viscosity of the modeling formulation is lower than 30 cps, or lower than 25 cps, or lower than 20 cps, at the working temperature. In some embodiments, the viscosity of the formulation is higher at room temperature and can be, for example, above 50 cps, or above 80 cps, at room temperature.

For achieving a desired viscosity, the concentration and type of the curable materials can be manipulated, as long as the concentration of the hydrophilic curable materials is maintained as at least 50 weight percents.

According to some of any of the embodiments described herein, the modeling formulation further comprises an initiator, for inducing a polymerization of the curable materials upon exposure to curing energy.

In some of these embodiments, the curable materials are all UV-curable materials and the initiator is a photoinitiator.

The photoinitiator can be a free radical photo-initiator, a cationic photo-initiator, or any combination thereof.

A free radical photoinitiator may be any compound that produces a free radical on exposure to radiation such as ultraviolet or visible radiation and thereby initiates a polymerization reaction. Non-limiting examples of suitable photoinitiators include benzophenones (aromatic ketones) such as benzophenone, methyl benzophenone, Michler's ketone and xanthones; acylphosphine oxide type photo-initiators such as 2,4,6-trimethylbenzolydiphenyl phosphine oxide (TMPO), 2,4,6-trimethylbenzoylethoxyphenyl phosphine oxide (TEPO), and bisacylphosphine oxides (BAPO's); benzoins and benzoin alkyl ethers such as benzoin, benzoin methyl ether and benzoin isopropyl ether and the like. Examples of photoinitiators are alpha-amino ketone, and bisacylphosphine oxide (BAPO's).

A free-radical photo-initiator may be used alone or in combination with a co-initiator. Co-initiators are used with initiators that need a second molecule to produce a radical that is active in the UV-systems. Benzophenone is an example of a photoinitiator that requires a second molecule, such as an amine, to produce a curable radical. After absorbing radiation, benzophenone reacts with a ternary amine by hydrogen abstraction, to generate an alpha-amino radical which initiates polymerization of acrylates. Non-limiting example of a class of co-initiators are alkanolamines such as triethylamine, methyldiethanolamine and triethanolamine.

Suitable cationic photoinitiators include, for example, compounds which form aprotic acids or Bronstead acids upon exposure to ultraviolet and/or visible light sufficient to initiate polymerization. The photoinitiator used may be a single compound, a mixture of two or more active compounds, or a combination of two or more different compounds, i.e. co-initiators. Non-limiting examples of suitable cationic photoinitiators include aryldiazonium salts, diaryliodonium salts, triarylsulphonium salts, triarylselenonium salts and the like. An exemplary cationic photoinitiator is a mixture of triarylsolfonium hexafluoroantimonate salts.

In some of any of the embodiments described herein, the uncured modeling formulation may further comprise one or more additional agents that are beneficially used in AM processes, as desired. Such agents include, for example, surface active agents, stabilizers, fillers, pigments, and/or dispersants.

The term "filler" describes an inert material modifies the properties of a polymeric material and/or adjusts a quality of the end products. The filler may be an inorganic particle, for example calcium carbonate, silica and clay.

Fillers may be added to the modeling formulation in order to reduce shrinkage during polymerization or during cooling, for example, to reduce the coefficient of thermal expansion, increase strength, increase thermal stability, reduce cost and/or adopt rheological properties. Nanoparticles fillers are typically useful in applications requiring low viscosity such as ink-jet applications.

In some embodiments, the modeling formulation comprises a surface active agent. A surface-active agent may be used to reduce the surface tension of the formulation to the value required for jetting or for printing process, which is typically around 30 dyne/cm. An exemplary such agent is silicone surface additive.

Suitable stabilizers include, for example, thermal stabilizers, which stabilize the formulation at high temperatures.

In some embodiments, the modeling formulation comprises one or more pigments. In some embodiments, the pigment's concentration is lower than 35%, or lower than 25% or lower than 15%, by weight.

The pigment may be a white pigment. The pigment may be an organic pigment or an inorganic pigment, or a metal pigment or a combination thereof.

In some embodiments the modeling formulation further comprises a dye.

In some embodiments, combinations of white pigments and dyes are used to prepare colored cured materials.

The dye may be any of a broad class of solvent soluble dyes. Some non-limiting examples are azo dyes which are yellow, orange, brown and red; anthraquinone and triarylmethane dyes which are green and blue; and azine dye which is black.

The Object:

According to an aspect of some embodiments of the present invention there is provided a 3D object, fabricated by an AM method as described herein.

According to some embodiments, the object comprises at least one part which is made of a modeling formulation as described herein, and this part is characterized by a water absorbance of at least 5%, as described herein.

In some embodiments, the object comprises multiple parts which are made of a modeling formulation as described herein and which are characterized by WA as described herein. In some embodiments, the object consists essentially of a modeling material formulation as described herein, and is characterized in its entirety by WA as described herein.

In some of any of the embodiments of this aspect of the present invention, the object or parts thereof which are made of a modeling formulation as described herein is further characterized by HDT higher than 40° C. and an impact resistance higher than 20 J/m, as these are defined herein in any of the respective embodiments and any combination thereof.

In some of any of the embodiments of this aspect of the present invention, the object, or parts thereof, which are made of the modeling formulation as described herein, comprises water. In some of these embodiments, the concentration of the water ranges from 0.1-4 weight percents, as described herein.

According to an aspect of some embodiments of the present invention there is provided a 3D printed object, in which one or more parts of the object, or the object in its entirety, is/are characterized by:
a water absorbance capability of at least 5%;
HDT higher than 40° C.; and
an impact resistance higher than 20 J/m,
as these values are defined herein in any of the respective embodiments and any combination thereof.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

Herein throughout, the phrase "linking moiety" or "linking group" describes a group that connects two or more moieties or groups in a compound. A linking moiety is typically derived from a bi- or tri-functional compound, and can be regarded as a bi- or tri-radical moiety, which is connected to two or three other moieties, via two or three atoms thereof, respectively.

Exemplary linking moieties include a hydrocarbon moiety or chain, optionally interrupted by one or more heteroatoms, as defined herein, and/or any of the chemical groups listed below, when defined as linking groups.

When a chemical group is referred to herein as "end group" it is to be interpreted as a substituent, which is connected to another group via one atom thereof.

Herein throughout, the term "hydrocarbon" collectively describes a chemical group composed mainly of carbon and hydrogen atoms. A hydrocarbon can be comprised of alkyl, alkene, alkyne, aryl, and/or cycloalkyl, each can be substituted or unsubstituted, and can be interrupted by one or more heteroatoms. The number of carbon atoms can range from 2 to 20, and is preferably lower, e.g., from 1 to 10, or from 1 to 6, or from 1 to 4. A hydrocarbon can be a linking group or an end group.

Bisphenol A is an example of a hydrocarbon comprised of 2 aryl groups and one alkyl group.

As used herein, the term "amine" describes both a —NR'R" group and a —NR'— group, wherein R' and R" are each independently hydrogen, alkyl, cycloalkyl, aryl, as these terms are defined hereinbelow.

The amine group can therefore be a primary amine, where both R' and R" are hydrogen, a secondary amine, where R' is hydrogen and R" is alkyl, cycloalkyl or aryl, or a tertiary amine, where each of R' and R" is independently alkyl, cycloalkyl or aryl.

Alternatively, R' and R" can each independently be hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, carbonyl, C-carboxylate, O-carboxylate, N-thiocarbamate, O-thiocarbamate, urea, thiourea, N-carbamate, O-carbamate, C-amide, N-amide, guanyl, guanidine and hydrazine.

The term "amine" is used herein to describe a —NR'R" group in cases where the amine is an end group, as defined hereinunder, and is used herein to describe a —NR'— group in cases where the amine is a linking group or is or part of a linking moiety.

The term "alkyl" describes a saturated aliphatic hydrocarbon including straight chain and branched chain groups. Preferably, the alkyl group has 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. More preferably, the alkyl is a medium size alkyl having 1 to 10 carbon atoms. Most preferably, unless otherwise indicated, the alkyl is a lower alkyl having 1 to 4 carbon atoms (C(1-4) alkyl). The alkyl group may be substituted or unsubstituted. Substituted alkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine.

The alkyl group can be an end group, as this phrase is defined hereinabove, wherein it is attached to a single adjacent atom, or a linking group, as this phrase is defined hereinabove, which connects two or more moieties via at least two carbons in its chain. When the alkyl is a linking group, it is also referred to herein as "alkylene" or "alkylene chain".

Herein, a C(1-4) alkyl, substituted by a hydrophilic group, as defined herein, is included under the phrase "hydrophilic group" herein.

Alkene and Alkyne, as used herein, are an alkyl, as defined herein, which contains one or more double bond or triple bond, respectively.

The term "cycloalkyl" describes an all-carbon monocyclic ring or fused rings (i.e., rings which share an adjacent pair of carbon atoms) group where one or more of the rings does not have a completely conjugated pi-electron system. Examples include, without limitation, cyclohexane, adamantane, norbornyl, isobornyl, and the like. The cycloalkyl group may be substituted or unsubstituted. Substituted cycloalkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The cycloalkyl group can be an end group, as this phrase is defined hereinabove, wherein it is attached to a single adjacent atom, or a linking group, as this phrase is defined hereinabove, connecting two or more moieties at two or more positions thereof.

Cycloalkyls of 1-6 carbon atoms, substituted by two or more hydrophilic groups, as defined herein, is included under the phrase "hydrophilic group" herein.

The term "heteroalicyclic" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofuran, tetrahydropyrane, morpholino, oxalidine, and the like. The heteroalicyclic may be substituted or unsubstituted. Substituted heteroalicyclic may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroalicyclic group can be an end group, as this phrase is defined hereinabove, where it is attached to a single adjacent atom, or a linking group, as this phrase is defined hereinabove, connecting two or more moieties at two or more positions thereof.

A heteroalicyclic group which includes one or more of electron-donating atoms such as nitrogen and oxygen, and in which a numeral ratio of carbon atoms to heteroatoms is 5:1 or lower, is included under the phrase "hydrophilic group" herein.

The term "aryl" describes an all-carbon monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The aryl group can be an end group, as this term is defined hereinabove, wherein it is attached to a single adjacent atom, or a linking group, as this term is defined hereinabove, connecting two or more moieties at two or more positions thereof.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furan, thiophene, imidazole, oxazole, thiazole, pyrazole, pyridine, pyrimidine, quinoline, isoquinoline and purine. The heteroaryl group may be substituted or unsubstituted. Substituted heteroaryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroaryl group can be an end group, as this phrase is defined hereinabove, where it is attached to a single adjacent atom, or a linking group, as this phrase is defined hereinabove, connecting two or more moieties at two or more positions thereof. Representative examples are pyridine, pyrrole, oxazole, indole, purine and the like.

The term "halide" and "halo" describes fluorine, chlorine, bromine or iodine.

The term "haloalkyl" describes an alkyl group as defined above, further substituted by one or more halide.

The term "sulfate" describes a —O—S(=O)$_2$—OR' end group, as this term is defined hereinabove, or an —O—S(=O)$_2$—O— linking group, as these phrases are defined hereinabove, where R' is as defined hereinabove.

The term "thiosulfate" describes a —O—S(=S)(=O)—OR' end group or a —O—S(=S)(=O)—O— linking group, as these phrases are defined hereinabove, where R' is as defined hereinabove.

The term "sulfite" describes an —O—S(=O)—O—R' end group or a —O—S(=O)—O— group linking group, as these phrases are defined hereinabove, where R' is as defined hereinabove.

The term "thiosulfite" describes a —O—S(=S)—O—R' end group or an —O—S(=S)—O— group linking group, as these phrases are defined hereinabove, where R' is as defined hereinabove.

The term "sulfinate" describes a —S(=O)—OR' end group or an —S(=O)—O— group linking group, as these phrases are defined hereinabove, where R' is as defined hereinabove.

The term "sulfoxide" or "sulfinyl" describes a —S(=O)R' end group or an —S(=O)— linking group, as these phrases are defined hereinabove, where R' is as defined hereinabove.

The term "sulfonate" describes a —S(=O)$_2$—R' end group or an —S(=O)$_2$— linking group, as these phrases are defined hereinabove, where R' is as defined herein.

The term "S-sulfonamide" describes a —S(=O)$_2$—NR'R" end group or a —S(=O)$_2$—NR'— linking group, as these phrases are defined hereinabove, with R' and R" as defined herein.

The term "N-sulfonamide" describes an R'S(=O)$_2$—NR"— end group or a —S(=O)$_2$—NR'— linking group, as these phrases are defined hereinabove, where R' and R" are as defined herein.

The term "disulfide" refers to a —S—SR' end group or a —S—S— linking group, as these phrases are defined hereinabove, where R' is as defined herein.

The term "phosphonate" describes a —P(=O)(OR')(OR") end group or a —P(=O)(OR')(O)— linking group, as these phrases are defined hereinabove, with R' and R" as defined herein.

The term "thiophosphonate" describes a —P(=S)(OR')(OR") end group or a —P(=S)(OR')(O)— linking group, as these phrases are defined hereinabove, with R' and R" as defined herein.

The term "phosphinyl" describes a —PR'R" end group or a —PR'— linking group, as these phrases are defined hereinabove, with R' and R" as defined hereinabove.

The term "phosphine oxide" describes a —P(=O)(R')(R") end group or a —P(=O)(R')— linking group, as these phrases are defined hereinabove, with R' and R" as defined herein.

The term "phosphine sulfide" describes a —P(=S)(R')(R") end group or a —P(=S)(R')— linking group, as these phrases are defined hereinabove, with R' and R" as defined herein.

The term "phosphite" describes an —O—PR'(=O)(OR") end group or an —O—PH(=O)(O)— linking group, as these phrases are defined hereinabove, with R' and R" as defined herein.

The term "carbonyl" or "carbonate" as used herein, describes a —C(=O)—R' end group or a —C(=O)— linking group, as these phrases are defined hereinabove, with R' as defined herein.

The term "thiocarbonyl" as used herein, describes a —C(=S)—R' end group or a —C(=S)— linking group, as these phrases are defined hereinabove, with R' as defined herein.

The term "oxo" as used herein, describes a (=O) group, wherein an oxygen atom is linked by a double bond to the atom (e.g., carbon atom) at the indicated position.

The term "thiooxo" as used herein, describes a (=S) group, wherein a sulfur atom is linked by a double bond to the atom (e.g., carbon atom) at the indicated position.

The term "oxime" describes a =N—OH end group or a =N—O— linking group, as these phrases are defined hereinabove.

The term "hydroxyl" describes a —OH group.

The term "alkoxy" describes both an —O-alkyl and an —O-cycloalkyl group, as defined herein.

The term "aryloxy" describes both an —O-aryl and an —O-heteroaryl group, as defined herein.

The term "thiohydroxy" describes a —SH group.

The term "thioalkoxy" describes both a —S-alkyl group, and a —S-cycloalkyl group, as defined herein.

The term "thioaryloxy" describes both a —S-aryl and a —S-heteroaryl group, as defined herein.

The "hydroxyalkyl" is also referred to herein as "alcohol", and describes an alkyl, as defined herein, substituted by a hydroxy group.

The term "cyano" describes a —C≡N group.

The term "cyanurate" describes a

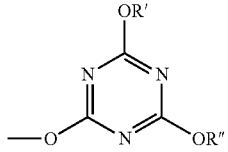

end group or

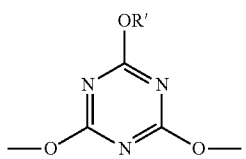

linking group, with R' and R" as defined herein.

The term "isocyanurate" describes a

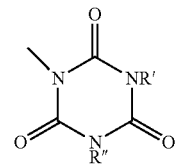

end group or a

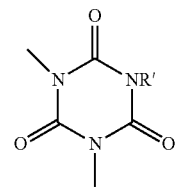

linking group, with R' and R" as defined herein.

The term "thiocyanurate" describes a

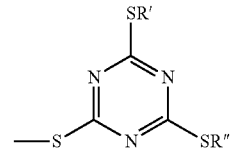

end group or

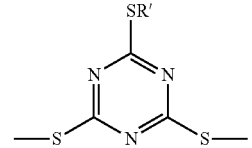

linking group, with R' and R" as defined herein.

The term "isocyanate" describes an —N=C=O group.

The term "isothiocyanate" describes an —N=C=S group.

The term "nitro" describes an —NO$_2$ group.

The term "acyl halide" describes a —(C=O)R"" group wherein R"" is halide, as defined hereinabove.

The term "azo" or "diazo" describes an —N=NR' end group or an —N=N— linking group, as these phrases are defined hereinabove, with R' as defined hereinabove.

The term "peroxo" describes an —O—OR' end group or an —O—O— linking group, as these phrases are defined hereinabove, with R' as defined hereinabove.

The term "carboxylate" as used herein encompasses C-carboxylate and O-carboxylate.

The term "C-carboxylate" describes a —C(=O)—OR' end group or a —C(=O)—O— linking group, as these phrases are defined hereinabove, where R' is as defined herein.

The term "O-carboxylate" describes a —OC(=O)R' end group or a —OC(=O)— linking group, as these phrases are defined hereinabove, where R' is as defined herein.

A carboxylate can be linear or cyclic. When cyclic, R' and the carbon atom are linked together to form a ring, in C-carboxylate, and this group is also referred to as lactone. Alternatively, R' and O are linked together to form a ring in O-carboxylate. Cyclic carboxylates can function as a linking group, for example, when an atom in the formed ring is linked to another group.

The term "thiocarboxylate" as used herein encompasses C-thiocarboxylate and O-thiocarboxylate.

The term "C-thiocarboxylate" describes a —C(=S)—OR' end group or a —C(=S)—O— linking group, as these phrases are defined hereinabove, where R' is as defined herein.

The term "O-thiocarboxylate" describes a —OC(=S)R' end group or a —OC(=S)— linking group, as these phrases are defined hereinabove, where R' is as defined herein.

A thiocarboxylate can be linear or cyclic. When cyclic, R' and the carbon atom are linked together to form a ring, in C-thiocarboxylate, and this group is also referred to as thiolactone. Alternatively, R' and O are linked together to form a ring in O-thiocarboxylate. Cyclic thiocarboxylates can function as a linking group, for example, when an atom in the formed ring is linked to another group.

The term "carbamate" as used herein encompasses N-carbamate and O-carbamate.

The term "N-carbamate" describes an R"OC(=O)—NR'— end group or a —OC(=O)—NR'— linking group, as these phrases are defined hereinabove, with R' and R" as defined herein.

The term "O-carbamate" describes an —OC(=O)—NR'R" end group or an —OC(=O)—NR'— linking group, as these phrases are defined hereinabove, with R' and R" as defined herein.

A carbamate can be linear or cyclic. When cyclic, R' and the carbon atom are linked together to form a ring, in O-carbamate. Alternatively, R' and O are linked together to form a ring in N-carbamate. Cyclic carbamates can function as a linking group, for example, when an atom in the formed ring is linked to another group.

The term "carbamate" as used herein encompasses N-carbamate and O-carbamate.

The term "thiocarbamate" as used herein encompasses N-thiocarbamate and O-thiocarbamate.

The term "O-thiocarbamate" describes a —OC(=S)—NR'R" end group or a —OC(=S)—NR'— linking group, as these phrases are defined hereinabove, with R' and R" as defined herein.

The term "N-thiocarbamate" describes an R"OC(=S)NR'— end group or a —OC(=S)NR'— linking group, as these phrases are defined hereinabove, with R' and R" as defined herein.

Thiocarbamates can be linear or cyclic, as described herein for carbamates.

The term "dithiocarbamate" as used herein encompasses S-dithiocarbamate and N-dithiocarbamate.

The term "S-dithiocarbamate" describes a —SC(=S)—NR'R" end group or a —SC(=S)NR'— linking group, as these phrases are defined hereinabove, with R' and R" as defined herein.

The term "N-dithiocarbamate" describes an R"SC(=S)NR'— end group or a —SC(=S)NR'— linking group, as these phrases are defined hereinabove, with R' and R" as defined herein.

The term "urea", which is also referred to herein as "ureido", describes a —NR'C(=O)—NR"R'" end group or a —NR'C(=O)—NR"— linking group, as these phrases are defined hereinabove, where R' and R" are as defined herein and R'" is as defined herein for R' and R".

The term "thiourea", which is also referred to herein as "thioureido", describes a —NR'—C(=S)—NR"R'" end group or a —NR'—C(=S)—NR"— linking group, with R', R" and R'" as defined herein.

The term "amide" as used herein encompasses C-amide and N-amide.

The term "C-amide" describes a —C(=O)—NR'R" end group or a —C(=O)—NR'-linking group, as these phrases are defined hereinabove, where R' and R" are as defined herein.

The term "N-amide" describes a R'C(=O)—NR"— end group or a R'C(=O)—N— linking group, as these phrases are defined hereinabove, where R' and R" are as defined herein.

An amide can be linear or cyclic. When cyclic, R' and the carbon atom are linked together to form a ring, in C-amide, and this group is also referred to as lactam. Cyclic amides can function as a linking group, for example, when an atom in the formed ring is linked to another group.

The term "guanyl" describes a R'R"NC(=N)— end group or a —R'NC(=N)— linking group, as these phrases are defined hereinabove, where R' and R" are as defined herein.

The term "guanidine" describes a —R'NC(=N)—NR"R'" end group or a —R'NC(=N)— NR"— linking group, as these phrases are defined hereinabove, where R', R" and R'" are as defined herein.

The term "hydrazine" describes a —NR'—NR"R'" end group or a —NR'—NR"-linking group, as these phrases are defined hereinabove, with R', R", and R'" as defined herein.

As used herein, the term "hydrazide" describes a —C(=O)—NR'—NR"R'" end group or a —C(=O)—NR'—NR"— linking group, as these phrases are defined hereinabove, where R', R" and R'" are as defined herein.

As used herein, the term "thiohydrazide" describes a —C(=S)—NR'—NR"R'" end group or a —C(=S)—NR'—NR"— linking group, as these phrases are defined hereinabove, where R', R" and R'" are as defined herein.

As used herein, the term "alkylene glycol" describes a —O—[(CR'R")$_z$—O]$_y$—R'" end group or a —O—[(CR'R")$_z$—O]$_y$— linking group, with R', R" and R'" being as defined herein, and with z being an integer of from 1 to 10, preferably, 2-6, more preferably 2 or 3, and y being an integer of 1 or more. Preferably R' and R" are both hydrogen. When z is 2 and y is 1, this group is ethylene glycol. When z is 3 and y is 1, this group is propylene glycol.

When y is greater than 4, the alkylene glycol is referred to herein as poly(alkylene glycol). In some embodiments of the present invention, a poly(alkylene glycol) group or moiety can have from 10 to 200 repeating alkyelene glycol units, such that z is 10 to 200, preferably 10-100, more preferably 10-50.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Materials and Methods

Materials:

The following materials were used for forming exemplary modeling material formulations, according to some embodiments of the present invention:

Formulations:

Modeling material formulations were prepared by mixing the selected monomers and/or oligomers, typically at room temperature. Monomers and oligomers which are solid at room temperature may be heated to melt before being mixed with other ingredients of the formulation. Table 1 below presents the chemical composition of exemplary formulations I-VII according to some embodiments of the present invention.

Hydrophobic and hydrophilic mono-functional monomeric materials, and hydrophobic and hydrophilic multi-functional monomeric materials, are as described herein.

For each formulation, the total amount (weight percents, wt %) of hydrophilic mono-functional and multi-functional monomeric materials is at least 50 weight percents, and no more than 80 weight percents.

TABLE 1

| No. | Hydrophobic mono-functional monomeric material (wt %) | Hydrophilic mono-functional monomeric material (wt %) | Hydrophilic multi-functional monomeric material (wt %) | Hydrophobic multi-functional monomeric material (wt %) |
|---|---|---|---|---|
| I | 0-15 | 20-40 | 10-30 | 15-35 |
| II | 10-30 | 25-45 | 10-30 | 15-35 |
| III* | 0-10 | 30-50 | 10-30 | 15-35 |
| IV | 20-40 | 5-25 | 25-45 | ) 10-30 |
| V | 5-25 | 30-50 | 10-30 | 15-35 |
| VI | 0-10 | 35-55 | 25-45 | 10-30 |
| VII | 0-10 | 45-65 | 10-30 | 15-35 |

*Formulation III further comprises a multi-functional oligomeric material as described herein, in an amount of 5-25 wt %.

Object Fabrication:

Objects were fabricated by inkjet printing each of the above-described formulations using, for example, Object® EDEN500V, Stratasys.

Properties:

Water absorbance (WA) was measured according to ASTM D57098, by weighing a cured printed part of 40×40×1 mm, before and after immersion in water for 24 hours at 25° C.

HDT was measured by HDT 3 VICAT (CEAST, Italy).

Izod Impact was measured by RESIL 5.5J (CEAST, Italy).

HDT and Izod Impact values were measured for the printed objects, upon curing. Of note, these values were not measured at conditions in which maximal water absorbance occurs (as, for example, the conditions used for determining water absorbance), but rather at ambient conditions, at which the object is in equilibrium with ambient environment (e.g., environment of up to 90% humidity), as described hereinabove.

EXPERIMENTAL RESULTS

Table 2 below presents the properties of objects fabricated as described herein, using exemplary formulations I-VII, as presented in Table 1 hereinabove, compared to the commercially available formulations VeroWhitePlus™ and RGD525™.

TABLE 2

|  | RGD525 ™ | VeroWhite ™ | I | II | III | IV | V | VI | VII |
|---|---|---|---|---|---|---|---|---|---|
| HDT | 60-65 | 45-50 | 48 | 56 | 54 | 49 | 59 | 48 | 60 |
| Izod Impact | 15-20 | 20-30 | 41 | 25 | 34 | 44 | 26 | 67 | 42 |
| WA | 1-1.5 | 1-1.5 | 6 | 6.5 | 10 | 10 | 13 | 23 | 29 |

As shown in Table 2, the tested formulations I-VII, although being characterized by high water absorbance, exhibit HDT at a desirable temperature range, and a much higher toughness, compared to commercially available formulations, as measured by the Izod impact thereof.

FIG. 3 presents the correlation between HDT and toughness (Impact resistance) of 3D-printed objected obtained using a commercially available formulation characterized by water absorption of about 1% (rectangles), and of exemplary formulations according to embodiments of the present invention, characterized by water absorption of 10% (diamonds) and 25% (triangles).

As shown in FIG. 3, an inverse correlation exists for a formulation characterized by WA of 1%, such that at a desirable HDT range, lower impact values are exhibited, and the higher the HDT is, the lower is the impact resistance.

Contrary to formulations characterized by WA of 1%, formulations characterized by higher water absorption feature a substantially improved balance of these properties. In these formulations, the toughness at a given HDT is higher compared to the low WA composition, and the HDT for a given toughness value is higher compared to the low WA formulations.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an

What is claimed is:

1. A modeling formulation for additive manufacturing comprising:
   at least one hydrophilic mono-functional UV-curable material;
   at least one hydrophilic multi-functional UV-curable material;
   at least one non-hydrophilic mono-functional UV-curable material; and
   at least one non-hydrophilic multi-functional UV-curable material;
   wherein a total concentration of said hydrophilic UV-curable materials is at least 50 weight percent of the total weight of said modeling formulation; and
   wherein a total concentration of said non-hydrophilic UV-curable materials is no more than 50 weight percent of the total weight of said modeling formulation,
   wherein the formulation forms upon curing, a material characterized by an impact resistance higher than 20 KJ/m and by a water absorption of at least 5%.

2. The modeling formulation of claim 1, wherein said total concentration of said hydrophilic UV-curable materials ranges from 50 to 80 weight percent.

3. The modeling formulation of claim 1, wherein each of said at least one hydrophilic mono-functional UV-curable material and said at least one hydrophilic multi-functional UV-curable material independently comprises at least one hydrophilic group.

4. The modeling formulation of claim 3, wherein said hydrophilic group is selected from the group consisting of an electron-donating heteroatom, a carboxylate, a thiocarboxylate, an amide, hydroxy, alkoxy, an alcohol, a heteroalicyclic, a lactone, a lactam, a carbamate, a thiocarbamate, a cyanurate, an isocyanurate, a thiocyanurate, urea, thiourea, an alkylene glycol, and a hydrophilic polymeric moiety.

5. The modeling formulation of claim 1, wherein said hydrophilic mono-functional UV-curable material is represented by Formula I:

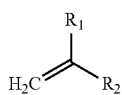

Formula I wherein at least one of $R_1$ and $R_2$ is said hydrophilic group.

6. The modeling formulation of claim 1, wherein said at least one hydrophilic multi-functional UV-curable material comprises a hydrophilic polymeric moiety.

7. The modeling formulation of claim 1, wherein said hydrophilic multi-functional UV-curable material is represented by Formula II:

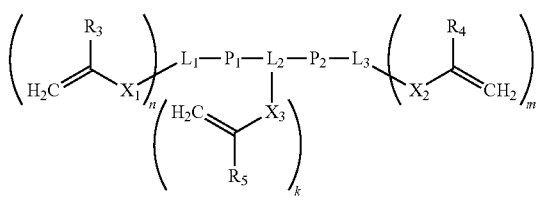

Formula II wherein:
   each of $R_3$, $R_4$ and $R_5$ is independently hydrogen, (C1-4) alkyl, or said hydrophilic group;
   each of $L_1$, $L_2$ and $L_3$ is independently a linking moiety or absent;
   each of $P_1$ and $P_2$ is independently said hydrophilic group or absent; and
   each of n, m and k is 0, 1, 2, 3 or 4,
   provided that n+m+k is at least 2, and provided that at least one of $R_3$, $R_4$, $R_5$, $P_1$ and $P_2$ is said hydrophilic group.

8. The modeling formulation of claim 7, wherein at least one of $P_1$ and $P_2$ is a hydrophilic polymeric moiety.

9. The modeling formulation of any one of claim 6, wherein said hydrophilic polymeric moiety comprises a poly(alkylene glycol).

10. The modeling formulation of claim 1, wherein a concentration of said at least one non-hydrophilic mono-functional UV-curable material is no more than 30 weight percent of the total weight of the formulation.

11. The modeling formulation of claim 1, wherein said at least one non-hydrophilic multi-functional UV-curable material comprises a monomeric material.

12. The modeling formulation of claim 11, wherein a concentration of said monomeric non-hydrophilic multi-functional UV-curable material ranges from 10 to 40 weight percent of the total weight of said formulation.

13. The modeling formulation of claim 1, wherein said at least one non-hydrophilic multi-functional UV-curable material comprises an oligomeric material.

14. The modeling formulation of claim 13, wherein a concentration of said oligomeric non-hydrophilic UV-curable material is lower than 30 weight percent of the total weight of said formulation.

15. The modeling formulation of claim 1, wherein said formulation is devoid of a hydrophobic mono-functional UV-curable material.

16. The modeling formulation of claim 1, wherein said formulation is devoid of an oligomeric multi-functional UV-curable material.

17. The modeling formulation of claim 1, wherein said formulation forms upon curing, a material characterized by a HDT higher than 40° C.

* * * * *